(12) United States Patent
Jin et al.

(10) Patent No.: US 10,715,293 B2
(45) Date of Patent: Jul. 14, 2020

(54) DMRS INDICATION METHOD AND SYSTEM, BASE STATION AND USER EQUIPMENT

(71) Applicant: CHINA MOBILE COMMUNICATIONS GROUP CO., LTD., Beijing (CN)

(72) Inventors: Jing Jin, Beijing (CN); Hui Tong, Beijing (CN); Fei Wang, Beijing (CN); Qixing Wang, Beijing (CN)

(73) Assignee: CHINA MOBILE COMMUNICATIONS GROUP CO., LTD., Beijing (CN)

(*) Notice: Subject to any disclaimer, the term of this patent is extended or adjusted under 35 U.S.C. 154(b) by 190 days.

(21) Appl. No.: 15/752,457

(22) PCT Filed: Aug. 12, 2016

(86) PCT No.: PCT/CN2016/094878
§ 371 (c)(1),
(2) Date: Feb. 13, 2018

(87) PCT Pub. No.: WO2017/028750
PCT Pub. Date: Feb. 23, 2017

(65) Prior Publication Data
US 2019/0013916 A1    Jan. 10, 2019

(30) Foreign Application Priority Data
Aug. 19, 2015    (CN) .......................... 2015 1 0512476

(51) Int. Cl.
*H04L 5/00*    (2006.01)
*H04L 1/16*    (2006.01)
(Continued)

(52) U.S. Cl.
CPC ......... *H04L 5/0051* (2013.01); *H04B 7/0452* (2013.01); *H04L 1/16* (2013.01);
(Continued)

(58) Field of Classification Search
None
See application file for complete search history.

(56) References Cited

U.S. PATENT DOCUMENTS

2012/0300656 A1*  11/2012  Cui ...................... H04B 7/0639
                                                    370/252
2012/0300728 A1   11/2012  Lee
(Continued)

FOREIGN PATENT DOCUMENTS

CN    101834629 A    9/2010
CN    102082595 A    6/2011
(Continued)

OTHER PUBLICATIONS

English Translation of the International Search Report in international application No. PCT/CN2016/094878, dated Oct. 26, 2016.
(Continued)

*Primary Examiner* — Alex Skripnikov
(74) *Attorney, Agent, or Firm* — Syncoda LLC; Feng Ma

(57) ABSTRACT

A demodulation reference signal (DMRS) indication method includes: a base station allocating designated DMRS ports, numbers of layers and orthogonal cover code (OCC) lengths to a user equipment (UE) according to a DMRS configuration parameter indication table, wherein a plurality of DMRS configuration parameter indication entries with a plurality of OCC length combinations of at least two OCC lengths are recorded in the DMRS configuration parameter indication table; according to DMRS configuration parameter information allocated to the UE, generating corresponding DMRS indication information, and sending the DMRS indication information to a corresponding UE. Also disclosed are a base station, a UE and a DMRS indication system.

30 Claims, 15 Drawing Sheets

(51) Int. Cl.
    *H04W 24/10*     (2009.01)
    *H04B 7/0452*     (2017.01)
    *H04L 27/26*     (2006.01)
    *H04W 72/04*     (2009.01)

(52) U.S. Cl.
    CPC .......... *H04L 5/0053* (2013.01); *H04L 5/0091* (2013.01); *H04L 27/2613* (2013.01); *H04W 24/10* (2013.01); *H04W 72/042* (2013.01)

(56) References Cited

U.S. PATENT DOCUMENTS

| | | |
|---|---|---|
| 2013/0235811 A1 | 9/2013 | Li |
| 2014/0286182 A1 | 9/2014 | Chen et al. |
| 2015/0188679 A1 | 7/2015 | Lee et al. |
| 2016/0036570 A1 | 2/2016 | Lee et al. |
| 2016/0173244 A1 | 6/2016 | Ding |
| 2017/0005766 A1 | 1/2017 | Lee et al. |
| 2017/0338929 A1 | 11/2017 | Lee et al. |
| 2018/0026684 A1* | 1/2018 | Wei ..................... H04B 7/0452 370/329 |
| 2018/0123658 A1 | 5/2018 | Li et al. |

FOREIGN PATENT DOCUMENTS

| | | |
|---|---|---|
| CN | 102123013 A | 7/2011 |
| CN | 104243087 A | 12/2014 |
| CN | 104348592 A | 2/2015 |
| CN | 104604170 A | 5/2015 |
| EP | 2503825 A1 | 9/2012 |
| EP | 2600535 A1 | 6/2013 |
| EP | 2894801 A1 | 7/2015 |

OTHER PUBLICATIONS

English Translation of the Written Opinion of the International Search Authority in international application No. PCT/CN2016/094878, dated Oct. 26, 2016.
3GPP. "Physical Channels and Modulation (Release 11)", 3GPP TS 36.211 V11.2.0 (Feb. 2013), Mar. 15, 2013 (Mar. 15, 2013), the whole document.
3GPP. "Small Cell Enhancements for E-UTRA and E-UTRAN-Physical Layer Aspects (Release 12)", 3GPP TR 36.872 V1.0.1 (Aug. 2013), Sep. 12, 2013 (Sep. 12, 2013), the whole document.
Supplementary European Search Report in European application No. 16836614.4, dated Aug. 9, 2018.
Overview of 3GPP Release 8 V0.3.3 (Sep. 2014).
Alcatel-Lucent et al, "DMRS Enhancement for High Dimensional Multi-user MIMO", 3GPP TSG RAN WG1 Meeting #82 R1-153816, issued on Aug. 15, 2015, the whole document.

* cited by examiner

| | | | | | | Normal CP | | | | | | | |
|---|---|---|---|---|---|---|---|---|---|---|---|---|---|
| 0 | 1 | 2 | 3 | 4 | 5 | 6 | 7 | 8 | 9 | 10 | 11 | 12 | 13 |

DMRS INDICATION METHOD AND SYSTEM, BASE STATION AND USER EQUIPMENT

CROSS-REFERENCE TO RELATED APPLICATIONS

The present application claims priority of Chinese Application No. 201510512476.8, filed on Aug. 19, 2015, the contents of which are hereby incorporated by reference in its entirety.

TECHNICAL FIELD

The present disclosure relates to the field of wireless communications, and in particular to a method, system, Base Station (BS), and User Equipment (UE) for indicating a De Modulation Reference Signal (DMRS).

BACKGROUND

A communication system in related art, such as a Long-Term Evolution (LTE) system, a Worldwide Interoperability for Microwave Access (WiMax) system, a Wireless Local Area Networks (WLAN) system using a standard 802.11n, generally uses conventional two-dimensional (2D) Multiple-Input Multiple-Output (MIMO) technology. A fundamental principle thereof is to improve quality of transmission and a system capacity using degrees of freedom in 2D space of an antenna on a horizontal plane.

However, with no major breakthrough in existing physical-layer technology, a hotspot under research is to find a solution for further improving utilization of a spectrum of a wireless communication system. A feasible solution at the time is to extend the conventional 2D MIMO to three-dimensional (3D) MIMO by taking full advantage of a degree of freedom in vertical space, to improve system performance by taking full advantage of degrees of freedom in 3D space.

However, DMRS indication based on the 2D MIMO no longer applies when 3D MIMO is adopted. Therefore, there is a pressing need for a solution for DMRS indication based on 3D MIMO.

SUMMARY

Embodiments herein provide a method, system, BS, and UE for indicating a DMRS.

A technical solution herein may be implemented as follows.

According to an embodiment herein, a method for indicating a De Modulation Reference Signal (DMRS) applies to a Base Station (BS) and includes:
allocating a designated DMRS port, a number of layers, and a length of Orthogonal Cover Codes (OCC) according to a table of DMRS configuration parameters, the table of DMRS configuration parameters including entries indicating DMRS configuration parameters of combinations of at least two lengths of OCCs; and
sending a DMRS indication generated corresponding to information on DMRS configuration parameters allocated.

The at least two lengths of OCCs may be 2 and 4, respectively.

The DMRS indication may be of 4 bits.

The method may further include: when allocating the designated DMRS port, the number of layers, and the length of the OCCs, allocating a designated SCrambling Identity (SCID) according to the table of DMRS configuration parameters.

The length of the OCCs may be allocated according to a total number of orthogonal user data flows.

The DMRS configuration parameters may be allocated according to allocated OCCs of the allocated length and the table of DMRS configuration parameters.

The length of the OCCs is allocated according to the total number of orthogonal user data flows by:
allocating a length of the allocated OCCs of 2 for a total number of orthogonal user data flows no greater than 2, or
allocating a length of the allocated OCCs of 4 for a total number of orthogonal user data flows greater than 2.

The DMRS indication may be contained in Downlink Control Information (DCI).

The DCI may be sent.

A total number of user data flows transmitted may be no more than 8.

A number of data flows per user for Multi-User (MU) transmission may be no more than 2.

The table of DMRS configuration parameters may include entries indicating DMRS configuration parameters for one-codeword transmission and entries indicating DMRS configuration parameters for two-codeword transmission.

The entries indicating DMRS configuration parameters for one-codeword transmission may include four entries indicating DMRS configuration parameters for one-layer transmission with a length of the OCCs of 2, eight entries indicating DMRS configuration parameters for one-layer transmission with a length of the OCCs of 4, three entries indicating DMRS configuration parameters for two-layer to four-layer retransmission with the length of the OCCs of 4, and a reserved entry.

The entries indicating DMRS configuration parameters for two-codeword transmission may include two entries indicating DMRS configuration parameters for two-layer transmission with the length of the OCCs of 2, four entries indicating DMRS configuration parameters for two-layer transmission with the length of the OCCs of 4, six entries indicating DMRS configuration parameters for Single-User (SU) three-layer to eight-layer transmission with the length of the OCCs of 4, and a reserved entry.

According to an embodiment herein, a method for indicating a De Modulation Reference Signal (DMRS) applies to User Equipment (UE), and includes:
receiving a DMRS indication; and
determining DMRS configuration parameters allocated according to the DMRS indication. The DMRS configuration parameters include a length of Orthogonal Cover Codes (OCC).

The DMRS indication may be of 4 bits.

The DMRS indication may be included in Downlink Control Information (DCI).

The DMRS configuration parameters allocated may be determined according to the 4-bit DMRS indication in the DCI.

The method may further include:
determining the OCCs allocated according to the determined length of the OCCs and a port corresponding to the determined length of the OCCs.

According to an embodiment herein, a method for indicating a De Modulation Reference Signal (DMRS) applies to a Base Station (BS), with a total number of user data flows transmitted being no more than 8, a number of data flows per user for Multi-User (MU) transmission being no more than 2, a number of data flows for Single-User (SU) transmission being no more than 4. The method includes:

allocating DMRS configuration parameters; and sending a DMRS indication of 3 bits generated corresponding to the DMRS configuration parameters allocated, the DMRS indication indicating information on the DMRS configuration parameters allocated.

The allocating DMRS configuration parameters may include:

allocating a designated DMRS port and a number of layers according to a table of DMRS configuration parameters.

The method may further include: while allocating the designated DMRS port and the number of layers according to the table of DMRS configuration parameters, allocating a designated SCrambling Identity (SCID) according to the table of DMRS configuration parameters.

The table of DMRS configuration parameters may include eight entries indicating DMRS configuration parameters for one-codeword one-layer transmission and entries indicating DMRS configuration parameters for two-codeword transmission.

The entries indicating DMRS configuration parameters for two-codeword transmission may include four entries indicating DMRS configuration parameters for two-layer transmission, two entries indicating DMRS configuration parameters for SU three-layer to four-layer transmission, and two entries indicating DMRS configuration parameters for two-layer data flow retransmission using one codeword.

The method may further include: for retransmission at a Transport Block (TB) transmitting a two-layer data flow in transmitting 3 or 4 SU data flows using two codewords, configuring, in Downlink Control Information (DCI), that 2 TBs are enabled, and indicating the information on the DMRS configuration parameters allocated using specific 3 bits in the DCI, the specific 3 bits indicating the information on the DMRS configuration parameters allocated for retransmission using one codeword at the TB transmitting the two-layer data flow.

According to an embodiment herein, a method for indicating a De Modulation Reference Signal (DMRS) applies to User Equipment (UE), with a total number of user data flows transmitted being no more than 8, a number of data flows per user for Multi-User (MU) transmission being no more than 2, a number of data flows for Single-User (SU) transmission being no more than 4. The method includes:

receiving a DMRS indication of 3 bits; and determining DMRS configuration parameters allocated according to the DMRS indication.

The DMRS indication may be included in Downlink Control Information (DCI).

The method may further include:

reading Transport Block (TB) information in the DCI, and determining that 2 TBs are enabled; and in response to determining that 3-bit information indicating the DMRS configuration parameters allocated in the DCI is specific 3-bit information, determining that a transmitted data flow is a two-layer data flow retransmitted using one codeword.

Orthogonal DMRS ports may be provided using Orthogonal Cover Codes (OCC) of a length 4 for data flow transmission. The method may further include:

determining OCCs allocated using a determined port.

According to an embodiment herein, a Base Station (BS) includes a first allocating unit, a first generating unit, and a first sending unit.

The first allocating unit is arranged for allocating a designated De Modulation Reference Signal (DMRS) port, a number of layers, and a length of Orthogonal Cover Codes (OCC) according to a table of DMRS configuration parameters. The table of DMRS configuration parameters includes entries indicating DMRS configuration parameters of combinations of at least two lengths of OCCs.

The first generating unit is arranged for generating a DMRS indication corresponding to information on DMRS configuration parameters allocated.

The first sending unit is arranged for sending the DMRS indication.

The first allocating unit may be further arranged for:

allocating the length of the OCCs according to a total number of orthogonal user data flows; and allocating the DMRS configuration parameters according to allocated OCCs of the allocated length and the table of DMRS configuration parameters.

According to an embodiment herein, User Equipment (UE) includes a first receiving unit and a first determining unit.

The first receiving unit is arranged for receiving a De Modulation Reference Signal (DMRS) indication.

The first determining unit is arranged for determining DMRS configuration parameters allocated according to the DMRS indication. The DMRS configuration parameters include a length of Orthogonal Cover Codes (OCC).

The first receiving unit may be arranged for receiving Downlink Control Information (DCI).

The first determining unit may be arranged for determining the DMRS configuration parameters allocated according to 4-bit DMRS indication in the DCI.

The first determining unit may be further arranged for determining the OCCs allocated according to the determined length of the OCCs and a port corresponding to the determined length of the OCCs.

According to an embodiment herein, a system for indicating a De Modulation Reference Signal (DMRS) includes a first Base Station (BS) and first User Equipment (UE).

The first BS is arranged for: allocating a designated DMRS port, a number of layers, and a length of Orthogonal Cover Codes (OCC) according to a table of DMRS configuration parameters, the table of DMRS configuration parameters including entries indicating DMRS configuration parameters of combinations of at least two lengths of OCCs; sending a DMRS indication generated corresponding to information on DMRS configuration parameters allocated, The first UE is arranged for receiving the DMRS indication, and determining the DMRS configuration parameters allocated according to the DMRS indication. The DMRS configuration parameters include the length of the OCCs.

According to an embodiment herein, a Base Station (BS) applies to where a total number of user data flows transmitted is no more than 8, a number of data flows per user for Multi-User (MU) transmission is no more than 2, and a number of data flows for Single-User (SU) transmission is no more than 4. The BS includes a second allocating unit, a second generating unit, and a second sending unit.

The second allocating unit is arranged for allocating DMRS configuration parameters.

The second generating unit is arranged for generating a DMRS indication of 3 bits corresponding to the DMRS configuration parameters allocated. The DMRS indication indicates information on the DMRS configuration parameters allocated, The second sending unit is arranged for sending the DMRS indication.

The BS may further include a third allocating unit arranged for: for retransmission at a Transport Block (TB) transmitting a two-layer data flow in transmitting 3 or 4 SU data flows using two codewords, configuring, in Downlink Control Information (DCI), that 2 TBs are enabled, The second generating unit may be arranged for: indicating, using specific 3 bits in the DCI, the information on the DMRS configuration parameters allocated for retransmission using one codeword at the TB transmitting the two-layer data flow.

An embodiment herein provides User Equipment (UE), with a total number of user data flows transmitted being no more than 8, a number of data flows per user for Multi-User (MU) transmission being no more than 2, a number of data flows for Single-User (SU) transmission being no more than 4. The UE includes a second receiving unit and a second determining unit.

The second receiving unit is arranged for receiving a De Modulation Reference Signal (DMRS) indication of 3 bits.

The second determining unit is arranged for determining DMRS configuration parameters allocated according to the DMRS indication.

The DMRS indication may be included in Downlink Control Information (DCI).

The second receiving unit may be arranged for receiving the DCI.

The UE may further include a third determining unit arranged for: reading Transport Block (TB) information in the DCI; determining that 2 TBs are enabled; in response to determining that 3-bit information indicating the DMRS configuration parameters allocated in the DCI is specific 3-bit information, determining that a transmitted data flow is a two-layer data flow retransmitted using one codeword.

Orthogonal DMRS ports may be provided using Orthogonal Cover Codes (OCC) of a length 4 for data flow transmission. The second determining unit may be further arranged for determining OCCs allocated using a determined port.

An embodiment herein provides a system for indicating a De Modulation Reference Signal (DMRS), with a total number of user data flows transmitted being no more than 8, a number of data flows per user for Multi-User (MU) transmission being no more than 2, a number of data flows for Single-User (SU) transmission being no more than 4. The system includes a second Base Station (BS) and second User Equipment (UE).

The second BS is arranged for: allocating DMRS configuration parameters; sending a DMRS indication of 3 bits generated corresponding to the DMRS configuration parameters allocated.

The second UE is arranged for receiving the DMRS indication, and determining the DMRS configuration parameters allocated according to the DMRS indication.

With the method, system, BS, and UE for indicating a DMRS according to an embodiment herein, a BS allocates a designated DMRS port, a number of layers, and a length of OCCs to UE according to a table of DMRS configuration parameters. The table of DMRS configuration parameters includes entries indicating DMRS configuration parameters of combinations of at least two lengths of OCCs. The BS generates a DMRS indication corresponding to information on DMRS configuration parameters allocated. The BS sends the DMRS indication to the UE. The UE receives the DMRS indication. The UE determines the DMRS configuration parameters allocated according to the DMRS indication. Therefore, DMRS indication in 3D MIMO is implemented. OCCs of different lengths are used for different data flow transmissions, providing better support to UE mobility, thereby ensuring system performance.

When a total number of user data flows transmitted is no more than 8, a number of data flows per user for MU transmission is no more than 2, and a number of data flows for SU transmission is no more than 4, a BS allocates DMRS configuration parameters to UE. The BS generates a DMRS indication of 3 bits corresponding to the DMRS configuration parameters allocated. The BS sends the DMRS indication to the UE. The UE receives the DMRS indication. The UE determines the DMRS configuration parameters allocated according to the DMRS indication. Therefore, DMRS indication in 3D MIMO is implemented. In addition, DMRS configuration parameters are indicated using but 3 bits in DCI, increasing no DCI overhead compared to existing 2D MIMO, reducing DCI overhead by 1 bit compared to 4-bit DCI overhead in 3D MIMO.

BRIEF DESCRIPTION OF THE DRAWINGS

Drawings herein are introduced briefly for clearer illustration of a technical solution herein. Note that the drawings described below refer merely to an embodiment herein. For those skilled in the art, other drawings may be obtained according to the drawings herein without creative effort. The drawings may not necessarily be drawn to scale, but are to show the main point of the present disclosure.

FIG. 2 is a diagram of resources occupied by DMRSs in related art.

FIG. 4 is a diagram of a DMRS pattern in related art.

DETAILED DESCRIPTION

Clear complete description to a technical solution herein is given below with reference to the drawings and embodiments herein. Clearly, embodiments illustrated herein are but some, instead of all, embodiments according to the present disclosure. Based on the embodiments herein, those skilled in the art may acquire another embodiment without creative effort. Any such embodiment falls within the scope of the present disclosure.

Before an embodiment herein is described, content relevant to 2D MIMO and to 3D MIMO may be introduced.

First, architecture of an antenna in 3D MIMO and in 2D MIMO may be introduced.

In architecture of an antenna in 2D MIMO, an increased antenna gain may be acquired using multiple array elements, i.e., N antennae, in a vertical dimension. An antenna array element in the vertical dimension may be given a fixed weight to acquire a beam form as needed in the vertical dimension. Thus, no pre-coding in the vertical dimension may be applied to MIMO.

Figure 1:
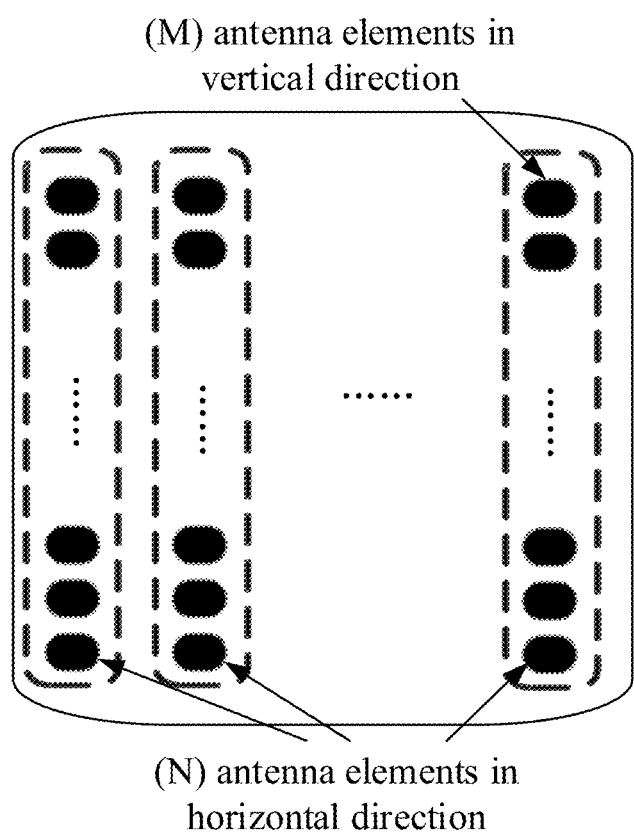
FIG. 1 is a diagram of architecture of an antenna in 3D MIMO in related art.

While in 3D MIMO, to take full advantage of MIMO in the vertical dimension, weights of antenna array elements in the vertical dimension may be controlled to form different beams. As shown in FIG. 1, architecture of an antenna in 3D MIMO may include a matrix of N×M antennae, with N antennae in a horizontal direction and M antennae in a vertical direction. That is, N antennae in 2D MIMO are extended to a matrix of N×M antennae, with each horizontal antenna thereof being formed by M (such as 8-10) antenna elements in the vertical direction.

Then, design of a DMRS in 2D MIMO is introduced.

According to a standard Release 12 (R12) in a 3rd Generation Partnership Project (3GPP) in related art, multiple data flows of multiple users may be supported in 2D MIMO by a total of 4 layers, which may include two orthogonal DMRS ports and two SCrambling Identities (SCID). The two orthogonal DMRS ports may be of port numbers (ports) 7 and 8, respectively, orthogonality thereof may be achieved using OCCs of a length 2. The two SCIDs are 0 and 1, respectively.

Figure 2:
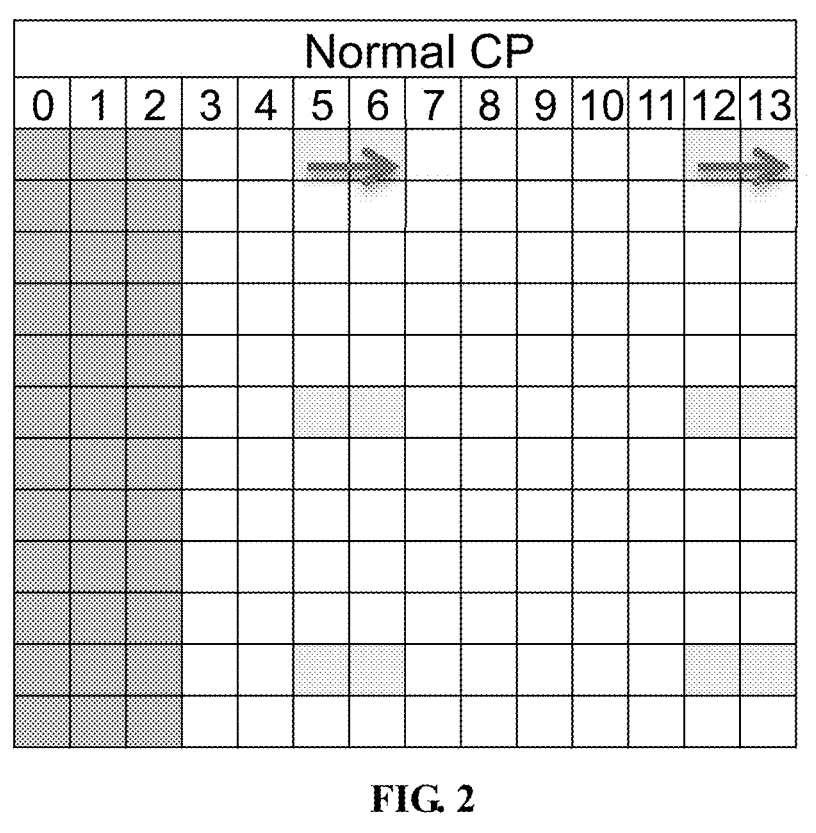

As shown in FIG. 2, according to the standard, resources (Resource Elements, RE) occupied by DMRSs may form a DMRS pattern in a DMRS indication transmitted to UE, Table 1 shows mapping of REs in Multi-User MIMO (MU-MIMO) in an existing specification.

TABLE 1

|  |  |  | (quasi-orthogonal) Scrambling | |
|---|---|---|---|---|
|  |  |  | $n_{SCID} = 0$ | $n_{SCID} = 1$ |
| (orthogonal) OCCs | Port 7 | [+1 +1] | Layer 1 | Layer 3 |
|  | Port 8 | [+1 −1] | Layer 2 | Layer 4 |

The $n_{SCID}$ may denote the SCIDs of the antenna port numbers 7 and 8.

Table 2 shows indications of DMRS port numbers, SCIDs, a number of data flows, etc., according to a standard in related art.

TABLE 2

| One codeword: Codeword 0 enabled; Codeword 1 disabled | | Two codewords: Codeword 0 enabled; Codeword 1 enabled | |
|---|---|---|---|
| Value | message | Value | message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = 1$ | 3 | 4 layers, ports 7-10 |
| 4 | 2 layers, port 7-8 | 4 | 5 layers, ports 7-11 |
| 5 | 3 layers, port 7-9 | 5 | 6 layers, ports 7-12 |
| 4 | 4 layers, port 7-10 | 6 | 7 layers, ports 7-13 |
| 7 | reserved | 7 | 8 layers, ports 7-14 |

In Table 2, in one-codeword transmission, indications of values 0-3 may indicate one-layer transmission. Indications 4-6 may indicate retransmission. An indication 7 is reserved.

In two-codeword transmission, indications 0-1 may indicate two-layer transmission. Indications 3-7 may indicate Single-User (SU) MIMO transmission. Moreover, 3 bits in DCI may be used to indicate DMRS configuration parameters allocated as shown in Table 2.

With reference to FIGS. 1, 2 and Tables 1, 2, a user data flow may be transmitted as follows.

(1) When there are two users, namely UE1 and UE2, each with one flow to be transmitted, DMRS configuration parameters may be allocated to the two users respectively as follows.

The port 7 and OCC [+1 +1] may be allocated to UE1.

The port 8 and OCC [+1 −1] may be allocated to UE2.

(2) When there are two users, namely UE1 and UE2, each with two flows to be transmitted, DMRS configuration parameters may be allocated to the two users respectively as follows.

The ports 7, 8 and $n_{SCID}=0$ may be allocated to UE1.

The ports 7, 8 and $n_{SCID}=1$ may be allocated to UE2.

(3) When there are four users, namely UE1, UE2, UE3 and UE4, each with one flow to be transmitted, DMRS configuration parameters may be allocated to the four users respectively as follows.

The port 7 and $n_{SCID}=0$ may be allocated to UE1.

The port 7 and $n_{SCID}=1$ may be allocated to UE2.

The port 8 and $n_{SCID}=0$ may be allocated to UE3.

The port 8 and $n_{SCID}=1$ may be allocated to UE4.

It may be seen that DMRS indication in 2D MIMO may support but transmission of no more than 4 MU data flows, with no more than 2 data flows per user, and may not support transmission of more than 4 MU data flows, where there may be 2-8 transmission channels. However, thanks to advantages such as capability of beamforming in both the horizontal dimension and the vertical dimension, a greater number of antenna elements, etc., with 3D MIMO, at least 16 channels may be supported, thereby distinguishing more paired users. Therefore, transmission of no more than 4 MU data flows supported in 2D MIMO may no longer apply to 3D MIMO. In other words, when 3D MIMO is used, DMRS indication based on 2D MIMO may no longer apply.

Accordingly, in embodiments herein, a BS allocates a designated DMRS port, a number of layers, and a length of OCCs to UE according to a table of DMRS configuration parameters. The table of DMRS configuration parameters includes entries indicating DMRS configuration parameters of combinations of at least two lengths of OCCs. The BS generates a DMRS indication corresponding to information on DMRS configuration parameters allocated to the UE. The BS sends the DMRS indication to the UE. The UE receives the DMRS indication. The UE determines the DMRS configuration parameters allocated to the UE according to the DMRS indication. Alternatively, when a total number of user data flows transmitted is no more than 8, a number of data flows per user for MU transmission is no more than 2, and a number of data flows for SU transmission is no more than 4, a BS allocates DMRS configuration parameters to UE. The BS generates a DMRS indication of 3 bits corresponding to the DMRS configuration parameters allocated to the UE. The BS sends the DMRS indication to the UE. The UE receives the DMRS indication. The UE determines the DMRS configuration parameters allocated to the UE according to the DMRS indication.

Figure 3:
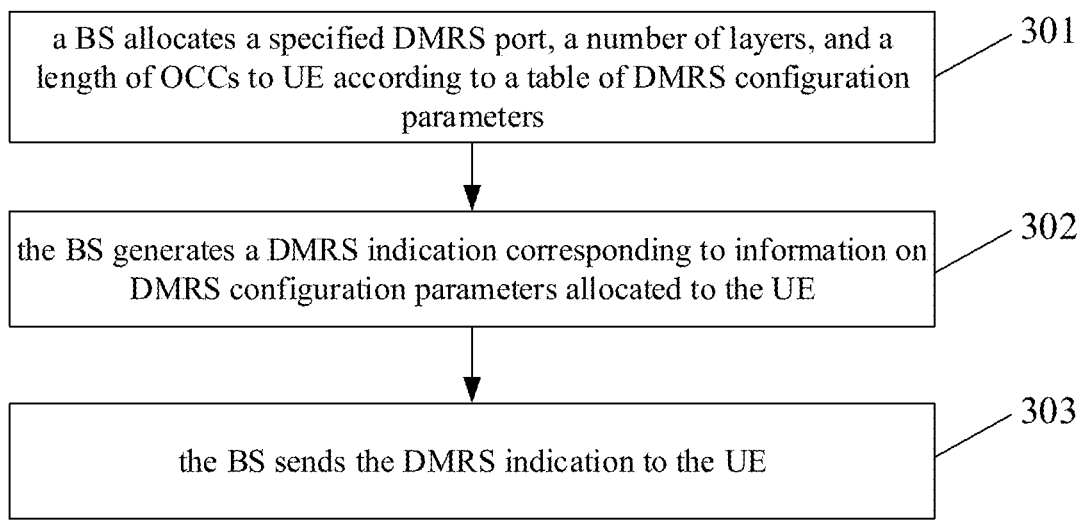
FIG. 3 is a flowchart of a method for indicating a DMRS at a BS according to an embodiment herein.

As shown in FIG. 3, a method for indicating a DMRS according to an embodiment herein applies to a BS. The method includes steps as follows.

In step 301, a BS allocates a designated DMRS port, a number of layers, and a length of OCCs to UE according to a table of DMRS configuration parameters.

The table of DMRS configuration parameters includes entries indicating DMRS configuration parameters of combinations of at least two lengths of OCCs.

The at least two lengths of OCCs may be 2 and 4, respectively.

When allocating the designated DMRS port, the number of layers, and the length of the OCCs to the UE, the BS may allocate a designated SCrambling Identity (SCID) to the UE according to the table of DMRS configuration parameters.

The entries indicating DMRS configuration parameters for one-codeword transmission may include at least one of: four entries indicating DMRS configuration parameters for one-layer transmission with a length of the OCCs of 2, eight entries indicating DMRS configuration parameters for one-layer transmission with a length of the OCCs of 4, three entries indicating DMRS configuration parameters for two-layer to four-layer retransmission with the length of the OCCs of 4, a reserved entry, etc.

The entries indicating DMRS configuration parameters for two-codeword transmission may include at least one of: two entries indicating DMRS configuration parameters for two-layer transmission with the length of the OCCs of 2, four entries indicating DMRS configuration parameters for two-layer transmission with the length of the OCCs of 4, six entries indicating DMRS configuration parameters for Single-User (SU) three-layer to eight-layer transmission with the length of the OCCs of 4, a reserved entry, etc.

Before the step is executed, the method may further include a step as follows.

The length of the OCCs may be allocated according to a total number of orthogonal user data flows.

The DMRS configuration parameters may be allocated to the UE according to allocated OCCs of the allocated length and the table of DMRS configuration parameters.

The BS may allocate a length of the allocated OCCs of 2 for a total number of orthogonal user data flows no greater than 2.

The BS may allocate a length of the allocated OCCs of 4 for a total number of orthogonal user data flows greater than 2.

The BS may determine the total number of orthogonal user data flows as needed.

Figure 4:
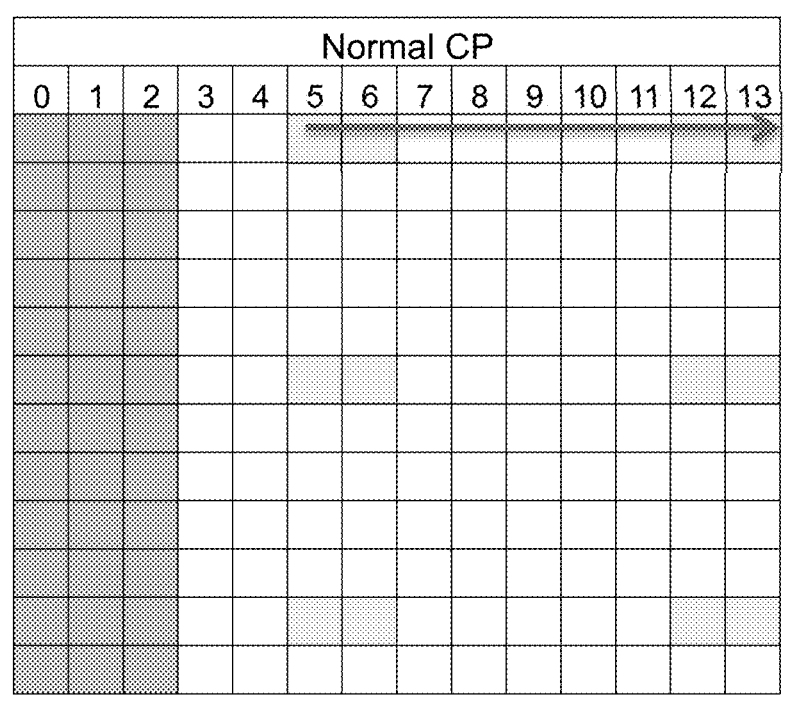

FIG. 4 shows a trend in the DMRS pattern for standardization discussion at present. A DMRS may be transmitted on 12 REs. Accordingly, OCCs of a length 4 (OCC=4) may be used to provide 4 orthogonal DMRS ports. In addition, $n_{SCID}=0$, 1 may provide quasi-orthogonal transmission of other 4 data flows, so as to support transmission of totally 8 MU data flows.

Table 3 exemplarily shows a design of a DMRS supporting transmission of no more than 8 MU data flows, following an OCC design at the same location supporting 8 SU data flows according to an existing standard.

TABLE 3

| | | | (quasi-orthogonal) Scrambling | |
| --- | --- | --- | --- | --- |
| | | | $n_{SCID} = 0$ | $n_{SCID} = 1$ |
| (orthogonal) OCCs | Port 7 | [+1 +1 +1 +1] | Layer 1 | Layer 5 |
| | Port 8 | [+1 −1 +1 −1] | Layer 2 | Layer 6 |
| | Port 9 | [+1 +1 −1 −1] | Layer 3 | Layer 7 |
| | Port 10 | [+1 −1 −1 +1] | Layer 4 | Layer 8 |

The OCC design may adopt a codeword design with OCCs of the length 4.

Note that in an actual application, a port number may not be limited to the ports 7, 8, 11, 13, etc.

Table 4 shows DMRS indication for no more than 8 MU data flows, accordingly.

TABLE 4

| indication of DMRS configuration parameters | | | |
| --- | --- | --- | --- |
| one codeword | | two codewords | |
| Value | message | Value | message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 2 layers, ports 11, 13, $n_{SCID} = 0$ |
| 3 | 1 layer, port 8, $n_{SCID} = 1$ | 3 | 2 layers, ports 11, 13, $n_{SCID} = 1$ |
| 4 | 1 layer, port 11, $n_{SCID} = 0$ | 4 | 3 layers, ports 7, 8 11, $n_{SCID} = 0$ |
| 5 | 1 layer, port 11, $n_{SCID} = 1$ | 5 | 3 layers, ports 7, 8, 11, $n_{SCID} = 1$ |
| 6 | 1 layer, port 13, $n_{SCID} = 0$ | 6 | 3 layers, ports 7-9 |
| 7 | 1 layer, port 13, $n_{SCID} = 1$ | 7 | 4 layers, ports 7, 8, 11, 13, $n_{SCID} = 0$ |
| 8 | 2 layers, port 7-8 | 8 | 4 layers, ports 7, 8, 11, 13, $n_{SCID} = 1$ |
| 9 | 3 layers, ports 7-9 | 9 | 4 layers, ports 7-10 |
| 10 | 4 layers, ports 7-10 | 10 | 5 layers, ports 7-11 |
| 11 | reserved | 11 | 6 layers, ports 7-12 |
| 12 | reserved | 12 | 7 layers, ports 7-13 |
| 13 | reserved | 13 | 8 layers, ports 7-14 |
| 14 | reserved | 14 | reserved |
| 15 | reserved | 15 | reserved |

4 bits in DCI may be used to indicate the DMRS configuration parameters according to Table 4.

OCCs work as follows. Assume that a channel on multiple Orthogonal Frequency Division Multiplexing (OFDM) symbols is invariant. A DMRS sequence may be transmitted on multiple OFDM symbols simultaneously for a diversity gain.

In a design of OCC=2 (the length of the OCCs being 2), assuming that a channel on OFDM symbols #5 and #6 remains the same, the DMRS port 7 may be transmitted in the channel on the OFDM symbols #5 and #6 using [+1 +1]. The DMRS port 8 may be transmitted in the channel on the OFDM symbols #5 and #6 using [+1 −1]. The OCCs may then be decoded as follows. The channel bearing the DMRS port 7 may be estimated as $S_7^H(y_5+y_6)/2$. The channel bearing the DMRS port 8 may be estimated as $S_8^H(y_5-y_6)/2$. The $S_7$ and the $S_8$ may denote signals corresponding respectively to the DMRS port 7 and the DMRS port 8. The $y_5$ and the $y_6$ may denote signals received respectively on the OFDM symbols #5 and #6. The $(\ )^H$ may denote conjugate transpose.

In a design of OCC=4 (the length of the OCCs being 4), assuming that a channel on OFDM symbols #5, #6, #12, and #13 remains the same, the DMRS port 7 may be transmitted in the channel on the OFDM symbols #5, #6, #12, and #13 using [+1 +1 +1 +1]. The DMRS port 8 may be transmitted in the channel on the OFDM symbols #5, #6, #12, and #13 using [+1 −1 +1 −1]. The DMRS port 11 may be transmitted in the channel on the OFDM symbols #5, #6, #12, and #13 using [+1 +1 −1 −1]. The DMRS port 13 may be transmitted in the channel on the OFDM symbols #5, #6, #12, and #13 using [+1 −1 −1 +1]. The OCCs may then be decoded as follows. The channel bearing the DMRS port 7 may be estimated as $S_7^H(y_5+y_6+y_{12}+y_{13})/4$. The channel bearing the DMRS port 8 may be estimated as $S_8^H(y_5-y_6+y_{12}-y_{13})/4$. The channel bearing the DMRS port 11 may be estimated as $S_{11}^H(y_5+y_6-y_{12}-y_{13})/4$. The channel bearing the DMRS port 13 may be estimated as $S_{13}^H(y_5-y_6-y_{12}+y_{13})/4$. The $S_7$, $S_8$, $S_{11}$, and $S_{13}$ may denote signals corresponding respectively to the DMRS ports 7, 8, 11, and 13. The $y_5$, $y_6$, $y_{12}$, and $y_{13}$ may denote signals received respectively on the OFDM symbols #5, #6, #12, and #13.

For OCC=4, invariance of the channel on the OFDM symbols #5~#13 has to be assumed. However, the channel on the OFDM symbols #5~#13 may change in a mobile environment. In addition, the change in the channel may increase with increase of a mobile speed, impacting accuracy in DMRS channel estimation. While for OCC=2, invariance of the channel is assumed but on the OFDM symbols #5 and #6. As an interval thereof is small and thus the change in the channel is small, impact thereof on accuracy in DMRS channel estimation is ignorable.

Therefore, OCCs of different lengths may have to be allocated to the UE to provide better support to UE mobility.

The design of OCC=2 may be adopted for a total number of orthogonal user data flows no greater than 2 to provide better support to mobility. The design of OCC=4 may be adopted for a total number of orthogonal user data flows greater than 2 to ensure four orthogonal users, so as to avoid interference during data flow transmission.

Accordingly, according to an embodiment herein, a total number of user data flows transmitted may be no more than 8, and a number of data flows per user for MU transmission may be no more than 2. The reason is as follows. First, if the number of data flows per user for MU transmission reaches a maximum of 4, then the DMRS may take up 12 REs and 24 REs respectively for MU and SU. This turns out to be inconsistent with the conclusion of the 3GPP R8 discussion, which concludes that 4 SU data flows take up 24 REs. Secondly, there is little chance of supporting transmission of 4 SU data flows in MU-MIMO. Thirdly, MU transmission with no more than 2 data flows per user is preferred in the industry.

For one-codeword transmission, the DMRS configuration parameters allocated to the UE may include at least one of: 1 layer, a port 7, a SCrambling Identity (SCID) 0, and OCC 2; or 1 layer, the port 7, an SCID 1, and OCC 2; or 1 layer, a port 8, the SCID 0, and OCC 2; or 1 layer, the port 8, the SCID 0, and OCC 2; or 1 layer, the port 7, the SCID 0, and OCC 4; or 1 layer, the port 7, the SCID 1, and OCC 4; or 1 layer, the port 8, the SCID 0, and OCC 4; or 1 layer, the port 8, the SCID 1, and OCC 4; or 1 layer, a port 11, the SCID 0, and OCC 4; or 1 layer, the port 11, the SCID 1, and OCC 4; or 1 layer, a port 13, the SCID 0, and OCC 4; or 1 layer, the port 13, the SCID 1, and OCC 4; or 2 layers, the ports 7-8, and OCC 4; or 3 layers, the ports 7-9, and OCC 4; or 4 layers, the ports 7-10, and OCC 4.

For two-codeword transmission, the DMRS configuration parameters allocated to the UE may include at least one of: 2 layers, the ports 7-8, the SCID 0, and OCC 2; or 2 layers, the ports 7-8, the SCID 1, and OCC 2; or 2 layers, the ports 7-8, the SCID 0, and OCC 4; or 2 layers, the ports 7-8, the SCID 1, and OCC 4; or 2 layers, the ports 11 and 13, the SCID 0, and OCC 4; or 2 layers, the ports 11 and 13, the SCID 1, and OCC 4; or 3 layers, the ports 7-9, and OCC 4; or 4 layers, the ports 7-10, and OCC 4; or 5 layers, the ports 7-11, and OCC 4; or 6 layers, ports 7-12, and OCC 4; or 7 layers, the ports 7-13, and OCC 4; or 8 layers, ports 7-14, and OCC 4.

OCC 2 denotes the length of the OCCs of 2. OCC 4 denotes the length of the OCCs of 4. The SCID 0 denotes an SCID of 0. The SCID 1 denotes an SCID of 1.

The DMRS configuration parameters allocated to the UE may further include at least one of the number of layers, the port number, etc. The DMRS configuration parameters allocated to the UE may further include an SCID.

The BS may store the table of DMRS configuration parameters as shown in Table 5, so as to select, for the UE, DMRS configuration parameters corresponding to the transmitted data flow(s).

TABLE 5

| | indication of DMRS configuration parameters | |
|---|---|---|
| | one codeword | two codewords |
| Value | message | message |
| 0 | 1 layer, port 7, $n_{SCID}$ = 0, OCC 2 | 2 layers, ports 7-8, $n_{SCID}$ = 0, OCC 2 |
| 1 | 1 layer, port 7, $n_{SCID}$ = 1, OCC 2 | 2 layers, ports 7-8, $n_{SCID}$ = 1, OCC 2 |
| 2 | 1 layer, port 8, $n_{SCID}$ = 0, OCC 2 | 2 layers, ports 7-8, $n_{SCID}$ = 0, OCC 4 |
| 3 | 1 layer, port 8, $n_{SCID}$ = 1, OCC 2 | 2 layers, ports 7-8, $n_{SCID}$ = 0, OCC 4 |
| 4 | 1 layer, port 7, $n_{SCID}$ = 0, OCC 4 | 2 layers, ports 11, 13, $n_{SCID}$ = 0, OCC 4 |
| 5 | 1 layer, port 7, $n_{SCID}$ = 1, OCC 4 | 2 layers, ports 11, 13, $n_{SCID}$ = 1, OCC 4 |
| 6 | 1 layer, port 8, $n_{SCID}$ = 0, OCC 4 | 3 layers, ports 7-9, OCC 4 |
| 7 | 1 layer, port 8, $n_{SCID}$ = 1, OCC 4 | 4 layers, ports 7-10, OCC 4 |
| 8 | 1 layer, port 11, $n_{SCID}$ = 0, OCC 4 | 5 layers, ports 7-11, OCC 4 |
| 9 | 1 layer, port 11, $n_{SCID}$ = 1, OCC 4 | 6 layers, ports 7-12, OCC 4 |
| 10 | 1 layer, port 13, $n_{SCID}$ = 0, OCC 4 | 7 layers, ports 7-13, OCC 4 |
| 11 | 1 layer, port 13, $n_{SCID}$ = 1, OCC 4 | 8 layers, ports 7-14, OCC 4 |
| 12 | 2 layers, port 7-8, OCC 4 | reserved |

TABLE 5-continued

| indication of DMRS configuration parameters | | | |
|---|---|---|---|
| one codeword | | two codewords | |
| Value | message | Value | message |
| 13 | 3 layers, ports 7-9, OCC 4 | 13 | reserved |
| 14 | 4 layers, ports 7-10, OCC 4 | 14 | reserved |
| 15 | reserved | 15 | reserved |

Table 5 may consist of one-codeword transmission and two-codeword transmission.

The one-codeword transmission may include:

(1) 4 cases of one-layer transmission with OCC=4, with a total number of orthogonal data flows no more than 2 (corresponding to indications 0-3 for one codeword in Table 5), (2) 8 cases of one-layer transmission with OCC=4, with a total number of orthogonal data flows more than 2 (corresponding to indications 4-11 for one codeword in Table 5), (3) two-layer to four-layer retransmission (corresponding to indications 12-14 for one codeword in Table 5), and (4) a reserved part (corresponding to the indication 15 for one codeword in Table 5).

The two-codeword transmission may include:

(1) 2 cases of two-layer transmission with OCC=2, with a total number of orthogonal data flows no more than 2 (corresponding to indications 0-1 for two codewords in Table 5), (2) 4 cases of two-layer transmission with OCC=4, with a total number of orthogonal data flows more than 2 (corresponding to indications 2-5 for two codewords in Table 5), (3) 3-8 SU data flows (three-layer to eight-layer) transmission (corresponding to indications 6-11 for two codewords in Table 5), and (4) a reserved part (corresponding to indications 12-15 for two codewords in Table 5).

To allocate DMRS configuration parameters to the UE, the BS may select, from Table 5, DMRS configuration parameters meeting a condition as needed, and include, in DCI, 4-bit indication of the value corresponding to the selected DMRS configuration parameters. For example, for three-user one-layer transmission using the 8 cases of one-layer transmission with OCC=4, the BS may allocate, to each of the three users, DMRS configuration parameters that are selected from Table 5 in a descending sequential order or randomly.

In step 302, the BS generates a DMRS indication corresponding to information on DMRS configuration parameters allocated to the UE.

The DMRS indication may indicate the information on the DMRS configuration parameters allocated to the UE. The information on the DMRS configuration parameters may include a length of OCCs.

The indicated length of OCCs may be for instructing the UE to select OCCs of the indicated length.

The DMRS indication may be of 4 bits.

The DMRS indication may be included in DCI corresponding to the UE.

The DMRS indication may be indicated by 4 bits in the DCI corresponding to the UE.

In step 303, the BS sends the DMRS indication to the UE. The BS may send the DCI to the UE.

Figure 5:
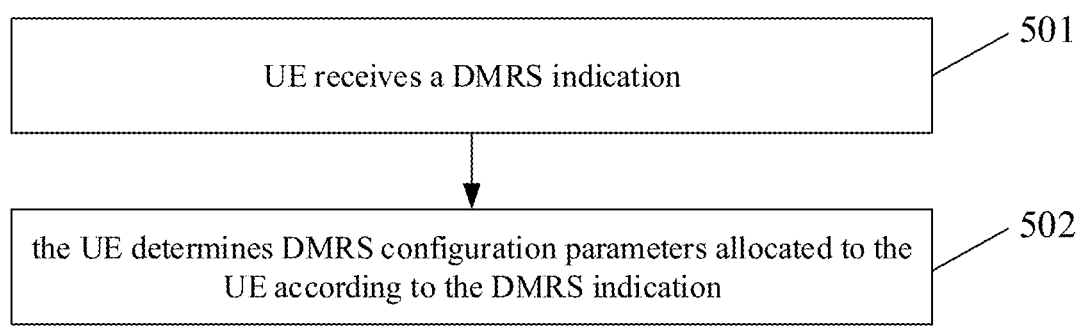
FIG. 5 is a flowchart of a method for indicating a DMRS at UE according to an embodiment herein.

As shown in FIG. 5, method for indicating a DMRS according to an embodiment herein applies to UE. The method includes steps as follows.

In step 501, UE receives a DMRS indication.

The UE may receive DCI. The DCI may include 4 bits indicating the DMRS indication.

In step 502, the UE determines DMRS configuration parameters allocated to the UE according to the DMRS indication.

The UE may determine the DMRS configuration parameters allocated to the UE according to the 4 bits indicating the DMRS indication in the DCI.

The DMRS configuration parameters may include a length of OCCs.

The determined length of OCCs may be 2 or 4.

The UE may also store a table of DMRS configuration parameters as shown in Table 5, so as to determine the DMRS configuration parameters allocated to the UE by searching the table for an indication of DMRS configuration parameters corresponding to the 4 bits.

When determining the DMRS configuration parameters, the UE may determine the OCCs allocated to the UE according to the determined length of the OCCs and a port corresponding to the determined length of the OCCs.

The port may be determined by determining a port number.

The UE may store a table of OCCs of different lengths corresponding to different port numbers. The UE may determine the length of the OCCs according to the indication of DMRS configuration parameters shown in Table 5. The UE may determine the OCCs allocated to the UE according to the determined length of the OCCs, a port corresponding to the determined length of the OCCs, and the table of OCCs. The UE may select a table of OCCs of the determined length. The UE may then determine, in the selected table of OCCs and according to the determined port, the OCCs allocated to the UE.

Figure 6:
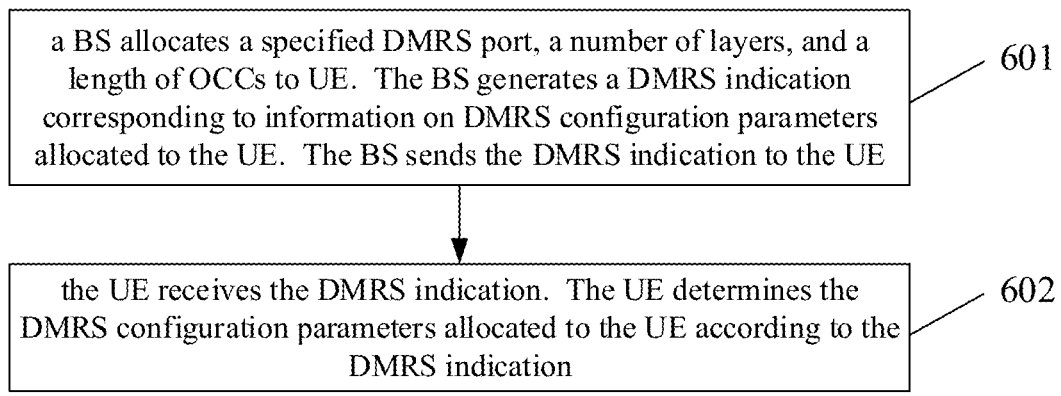
FIG. 6 is a flowchart of a method for indicating a DMRS according to an embodiment herein.

As shown in FIG. 6, a method for indicating a DMRS according to an embodiment herein includes steps as follows.

In step 601, a BS allocates a designated DMRS port, a number of layers, and a length of OCCs to UE according to a table of DMRS configuration parameters. The table of DMRS configuration parameters includes entries indicating DMRS configuration parameters of combinations of at least two lengths of OCCs. The BS generates a DMRS indication corresponding to information on DMRS configuration parameters allocated to the UE. The BS sends the DMRS indication to the UE.

The DMRS indication may indicate the information on the DMRS configuration parameters allocated to the UE. The information on the DMRS configuration parameters may include a length of OCCs.

In step 602, the UE receives the DMRS indication. The UE determines the DMRS configuration parameters allocated to the UE according to the DMRS indication.

Note that detailed implementation of steps 601 and 602 has been elaborated, and will not be repeated here.

With the method for indicating a DMRS according to an embodiment herein, a BS allocates a designated DMRS port, a number of layers, and a length of OCCs to UE according to a table of DMRS configuration parameters. The table of DMRS configuration parameters includes entries indicating DMRS configuration parameters of combinations of at least two lengths of OCCs. The BS generates a DMRS indication corresponding to information on DMRS configuration parameters allocated to the UE. The BS sends the DMRS indication to the UE. The UE receives the DMRS indication. The UE determines the DMRS configuration parameters allocated to the UE according to the DMRS indication. Therefore, DMRS indication in 3D MIMO is implemented. OCCs of different lengths are used for different data flow transmissions, providing better support to UE mobility, thereby ensuring system performance.

Figure 7:
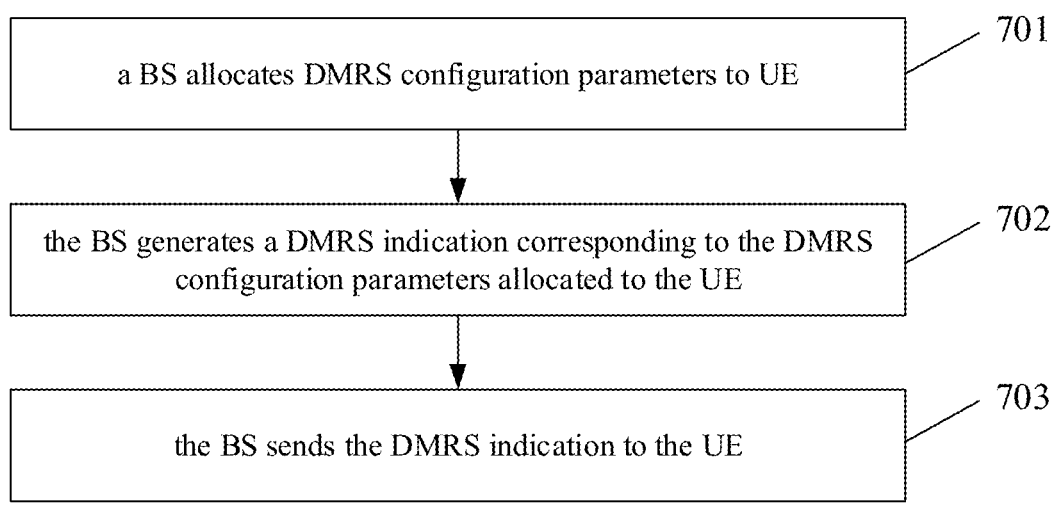
FIG. 7 is a flowchart of a method for indicating a DMRS at a BS according to an embodiment herein.

As shown in FIG. 7, a method for indicating a DMRS according to an embodiment herein applies to a BS, where a total number of user data flows transmitted is no more than 8, a number of data flows per user for MU transmission is no more than 2, and a number of data flows for SU transmission is no more than 4. The method includes steps as follows.

In step 701, a BS allocates DMRS configuration parameters to UE.

OCC of a length 4 may be used.

In step 702, the BS generates a DMRS indication of 3 bits corresponding to the DMRS configuration parameters allocated to the UE.

The DMRS indication may indicate the information on the DMRS configuration parameters allocated to the UE.

The DMRS indication may be included in DCI.

DMRS indication as shown in Table 4 may be indicated using 4 bits in DCI. This increases DCI overhead as it costs one more bit compared to an existing solution where 3 bits are used to indicate information on DMRS configuration parameters allocated to UE. As DCI is transmitted in a downlink sub-frame, DCI shall be designed to consume a minimal overhead. According to an embodiment herein, information on DMRS configuration parameters allocated to UE may also be indicated using 3 bits, as elaborated below.

For retransmission at a Transport Block (TB) transmitting a two-layer data flow in transmitting 3 or 4 SU data flows using two codewords, the BS may configure, in DCI (TB information), that 2 TBs are enabled, and indicate the information on the DMRS configuration parameters allocated to the UE using specific 3 bits in the DCI. The specific 3 bits may indicate the information on the DMRS configuration parameters allocated to the UE for retransmission using one codeword at the TB transmitting the two-layer data flow.

Data flow retransmission is so implemented for the reason(s) as follows.

Regarding indication of DMRS configuration parameters as shown in Table 4, for transmission of one data flow per user in MU-MIMO, 8 cases of one codeword may be used for DMRS indication to 8 users, as shown in Table 6.

TABLE 6

| one codeword | |
|---|---|
| Value | message |
| 0 | 1 layer, port 7, $n_{SCID} = 0$ |
| 1 | 1 layer, port 7, $n_{SCID} = 1$ |
| 2 | 1 layer, port 8, $n_{SCID} = 0$ |
| 3 | 1 layer, port 8, $n_{SCID} = 1$ |
| 4 | 1 layer, port 11, $n_{SCID} = 0$ |
| 5 | 1 layer, port 11, $n_{SCID} = 1$ |
| 6 | 1 layer, port 13, $n_{SCID} = 0$ |
| 7 | 1 layer, port 13, $n_{SCID} = 1$ |

According to Table 6, 3 bits may have already been taken for indication of DMRS configuration parameters via DCI. Thus, indication of DMRS configuration parameters for retransmission of multiple SU data flows using one codeword may be implemented by combining the TB information in DCI.

The nature of so called retransmission may be explained first.

Fresh (first-time) transmission of more than one data flow may always be implemented using two codewords. To transmit 2N data flows, each codeword may correspond to TBs of N data flows. To transmit 2N+1 data flows, a first codeword may correspond to TBs of N data flows, and a second codeword may correspond to TBs of N+1 data flows.

Meanwhile, transmission of more than one data flow using one codeword may occur only at retransmission. Retransmission may always be implemented by a single TB, corresponds to one codeword. One codeword may be understood as one TB.

In addition, two codewords may be used for transmitting 3 fresh data flows. The two codewords may be mapped into 1 data flow and 2 data flows, respectively. If the TB transmitting the 2 data flows has not be received correctly, retransmission may be done but for the corresponding codeword. This is when 2 data flows are transmitted using one codeword.

Secondly, for retransmission of multiple SU data flows, given a relatively low probability of transmitting 5-8 SU data flows, DMRS indication for transmitting 5-8 SU data flows in the table of DMRS configuration parameters may be ignored. Namely, the number of SU data flows transmitted may be defined to be no greater than 4, thereby forming a table of DMRS configuration parameters as shown in Table 7 to indicate DMRS configuration parameters allocated to UE using 3 bits.

TABLE 7

| indication of DMRS configuration parameters | | | |
|---|---|---|---|
| one codeword | | two codewords | |
| Value | message | Value | message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 2 layers, ports 11, 13, $n_{SCID} = 0$ |
| 3 | 1 layer, port 8, $n_{SCID} = 1$ | 3 | 2 layers, ports 11, 13, $n_{SCID} = 0$ |
| 4 | 1 layer, port 11, $n_{SCID} = 0$ | 4 | 3 layers, ports 7-9 |
| 5 | 1 layer, port 11, $n_{SCID} = 1$ | 5 | 4 layers, ports 7-10 |
| 6 | 1 layer, port 13, $n_{SCID} = 0$ | 6 | 2 layers, ports 7-8, codeword0 |
| 7 | 1 layer, port 13, $n_{SCID} = 1$ | 7 | 2 layers, ports 7-8, codeword1 |

Table 7 may consist of one-codeword transmission and two-codeword transmission.

The one-codeword transmission may include:

8 cases of one-layer transmission (corresponding to indications 0-7 for one codeword in Table 7).

The two-codeword transmission may include:

(1) 2 cases of two-layer transmission with OCC=2, with a total number of orthogonal data flows no more than 2 (corresponding to indications 0-1 for two codewords in Table 5), (2) 4 cases of two-layer transmission (corresponding to indications of values 0-3 for two codewords in Table 7), (3) transmission of 3-4 SU data flows (corresponding to indications 4-5 for two codewords in Table 7), and (4) two-layer to four-layer retransmission (corresponding to indications 6-7 for two codewords in Table 7).

Accordingly, for one-codeword transmission, the DMRS configuration parameters allocated to the UE may include at least one of: 1 layer, a port 7, an SCID 0; or 1 layer, the port 7, an SCID 1; or 1 layer, a port 8, the SCID 0; or 1 layer, the port 8, the SCID 1; or 1 layer, a port 11, the SCID 0; or 1 layer, the port 11, the SCID 1; or 1 layer, a port 13, the SCID 0; or 1 layer, the port 13, the SCID 1.

For two-codeword transmission, the DMRS configuration parameters allocated to the UE may include at least one of: 2 layers, the ports 7-8, the SCID 0; or 2 layers, the ports 7-8, the SCID 1; or 2 layers, the ports 11 and 13, the SCID 0; or 2 layers, the ports 11 and 13, the SCID 1; or 3 layers, the ports 7-9; or 4 layers, the ports 7-10.

For retransmitted data flows, the DMRS configuration parameters allocated to the UE may include at least one of: 2 layers, the ports 7-8, a codeword 0; or 2 layers, the ports 7-8, a codeword 1.

The SCID 0 may denote an SCID of 0. The SCID 1 may denote an SCID of 1.

The BS may allocate the DMRS configuration parameters to the UE as follows.

The BS may allocate a designated DMRS port and a number of layers to the UE according to a table of DMRS configuration parameters.

While the BS allocates the designated DMRS port and the number of layers to the UE according to the table of DMRS configuration parameters, the BS allocates a designated SCID to the UE according to the table of DMRS configuration parameters.

The table of DMRS configuration parameters may include eight entries indicating DMRS configuration parameters for one-codeword one-layer transmission and entries indicating DMRS configuration parameters for two-codeword transmission.

The entries indicating DMRS configuration parameters for two-codeword transmission may include four entries indicating DMRS configuration parameters for two-layer transmission, two entries indicating DMRS configuration parameters for SU three-layer to four-layer transmission, two entries indicating DMRS configuration parameters for two-layer data flow retransmission using one codeword, etc.

The BS may store the table of DMRS configuration parameters as shown in Table 7, so as to select, for the UE, DMRS configuration parameters corresponding to the transmitted data flow(s).

To select DMRS configuration parameters for the UE, the BS may select, from Table 7, DMRS configuration parameters meeting a condition as needed, and include, in DCI, 3-bit indication of the value corresponding to the selected DMRS configuration parameters. For example, for three-user one-layer transmission using the 8 cases of one-layer transmission, the BS may allocate, to each of the three users, DMRS configuration parameters that are selected from Table 7 in a descending sequential order or randomly.

In step 803, the BS sends the DMRS indication to the UE.

The DMRS indication may be included in the DCI. The DCI may then be sent to the UE.

Figure 8:
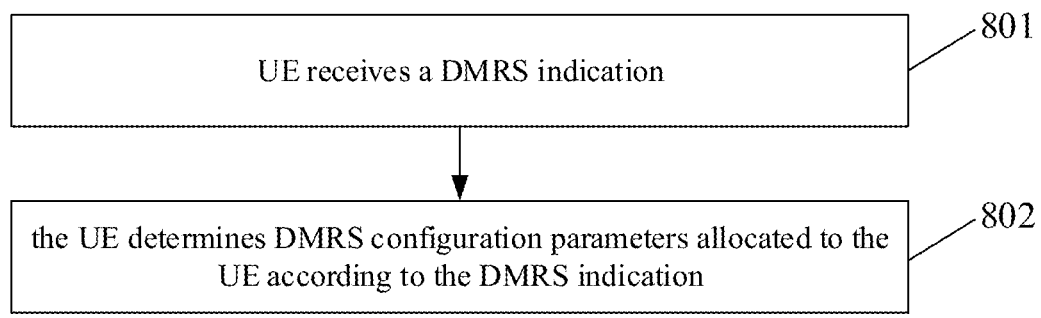
FIG. 8 is a flowchart of a method for indicating a DMRS at UE according to an embodiment herein.

As shown in FIG. 8, a method for indicating a DMRS according to an embodiment herein applies to UE, where a total number of user data flows transmitted is no more than 8, a number of data flows per user for MU transmission is no more than 2, and a number of data flows for SU transmission is no more than 4. The method includes steps as follows.

In step 801, UE receives a DMRS indication.

The DMRS indication may be of 3 bits.

The DMRS indication may be included in DCI.

In step 802, the UE determines DMRS configuration parameters allocated to the UE according to the DMRS indication.

The UE may read TB information in the DCI, and determine that 2 TBs are enabled.

When 3-bit information indicating the DMRS configuration parameters allocated to the UE in the DCI is specific 3-bit information, the UE may determine that a transmitted data flow is a two-layer data flow retransmitted using one codeword.

The UE may also store a table of DMRS configuration parameters as shown in Table 7. The UE may read the TB information in received DCI. If the TB information indicates that both TBs are enabled, indications of DMRS configuration parameters corresponding to two codewords in Table 7 should be searched for a corresponding value. When the specific 3 bits in the DCI for indicating the DMRS configuration parameters allocated to the UE give 6, the UE may determine that it's retransmission of two flows using the codeword 0. When the specific 3 bits in the DCI for indicating the DMRS configuration parameters allocated to the UE give 7, the UE may determine that it's retransmission of two flows using the codeword 1.

Orthogonal DMRS ports may be provided using OCCs of the length 4 for data flow transmission. When determining the DMRS configuration parameters, the UE may determine OCCs allocated to the UE using a determined port.

The port may be determined by determining a port number.

The UE may store a table of OCCs of the length 4 corresponding to different port numbers. The UE may determine a port number according to the table of DMRS configuration parameters shown in Table 7. The UE may determine OCCs allocated to the UE according to the determined port number and the table of OCCs.

Figure 9:
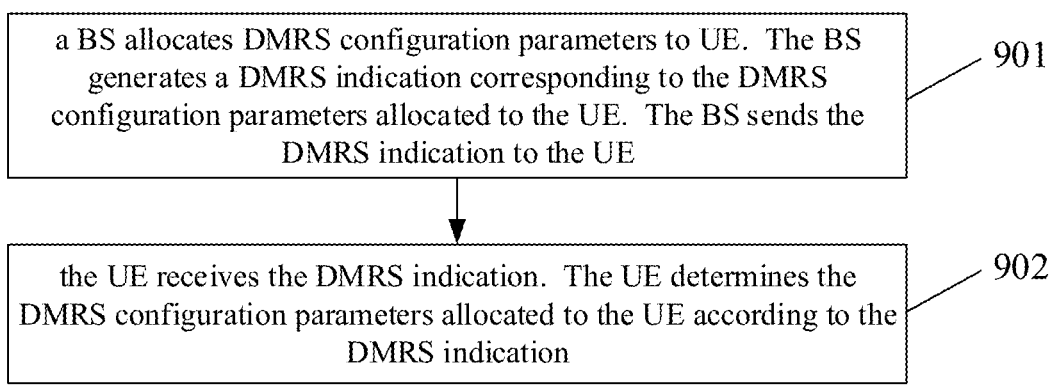
FIG. 9 is a flowchart of a method for indicating a DMRS according to an embodiment herein.

As shown in FIG. 9, a method for indicating a DMRS according to an embodiment herein applies where a total number of user data flows transmitted is no more than 8, a number of data flows per user for MU transmission is no more than 2, and a number of data flows for SU transmission is no more than 4. The method includes steps as follows.

In step 901, a BS allocates DMRS configuration parameters to UE. The BS generates a DMRS indication of 3 bits corresponding to the DMRS configuration parameters allocated to the UE. The BS sends the DMRS indication to the UE.

In step 902, the UE receives the DMRS indication. The UE determines the DMRS configuration parameters allocated to the UE according to the DMRS indication.

Note that detailed implementation of steps 901 and 902 has been elaborated, and will not be repeated here.

With the method for indicating a DMRS according to an embodiment herein, when a total number of user data flows transmitted is no more than 8, a number of data flows per user for MU transmission is no more than 2, and a number of data flows for SU transmission is no more than 4, a BS allocates DMRS configuration parameters to UE. The BS generates a DMRS indication of 3 bits corresponding to the DMRS configuration parameters allocated to the UE. The BS sends the DMRS indication to the UE. The UE receives the DMRS indication. The UE determines the DMRS configuration parameters allocated to the UE according to the DMRS indication. Therefore, DMRS indication in 3D MIMO is implemented. In addition, DMRS configuration parameters are indicated using but 3 bits in DCI, increasing no DCI overhead compared to existing 2D MIMO, reducing DCI overhead by 1 bit compared to a conventional 4-bit DCI overhead in 3D MIMO.

Figure 10:
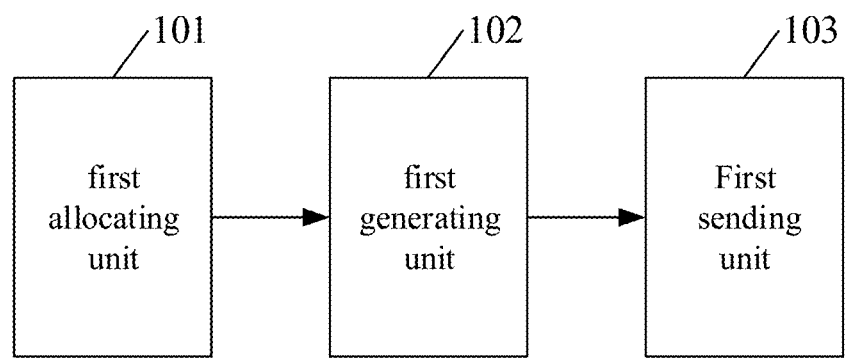
FIG. 10 is a diagram of a structure of a BS according to an embodiment herein.

As shown in FIG. 10, to implement the method for indicating a DMRS described with reference to FIGS. 3-6, a BS according to an embodiment herein includes a first allocating unit 101, a first generating unit 102, and a first sending unit 103.

The first allocating unit 101 is arranged for allocating a designated De Modulation Reference Signal (DMRS) port, a number of layers, and a length of Orthogonal Cover Codes (OCC) to User Equipment (UE) according to a table of DMRS configuration parameters. The table of DMRS configuration parameters includes entries indicating DMRS configuration parameters of combinations of at least two lengths of OCCs.

The first generating unit 102 is arranged for generating a DMRS indication corresponding to information on DMRS configuration parameters allocated to the UE The first sending unit 103 is arranged for sending the DMRS indication to the UE.

The at least two lengths of OCCs may be 2 and 4, respectively.

The first allocating unit 101 may be further arranged for: when allocating the designated DMRS port, the number of layers, and the length of the OCCs to the UE, allocating a designated SCrambling Identity (SCID) to the UE according to the table of DMRS configuration parameters.

The entries indicating DMRS configuration parameters for one-codeword transmission may include at least one of: four entries indicating DMRS configuration parameters for one-layer transmission with a length of the OCCs of 2, eight entries indicating DMRS configuration parameters for one-layer transmission with a length of the OCCs of 4, three entries indicating DMRS configuration parameters for two-layer to four-layer retransmission with the length of the OCCs of 4, a reserved entry, etc.

The entries indicating DMRS configuration parameters for two-codeword transmission may include at least one of: two entries indicating DMRS configuration parameters for two-layer transmission with the length of the OCCs of 2, four entries indicating DMRS configuration parameters for two-layer transmission with the length of the OCCs of 4, six entries indicating DMRS configuration parameters for Single-User (SU) three-layer to eight-layer transmission with the length of the OCCs of 4, a reserved entry, etc.

The first allocating unit 101 may be further arranged for allocating the length of the OCCs according to a total number of orthogonal user data flows; and allocating the DMRS configuration parameters to the UE according to allocated OCCs of the allocated length and the table of DMRS configuration parameters.

The first allocating unit 101 is arranged for: allocating a length of the allocated OCCs of 2 for a total number of orthogonal user data flows no greater than 2, or allocating a length of the allocated OCCs of 4 for a total number of orthogonal user data flows greater than 2.

The first allocating unit 101 may determine the total number of orthogonal user data flows as needed.

FIG. 4 shows a trend in the DMRS pattern for standardization discussion at present. A DMRS may be transmitted on 12 REs. Accordingly, OCCs of a length 4 (OCC=4) may be used to provide 4 orthogonal DMRS ports. In addition, $n_{SCID}=0$, 1 may provide quasi-orthogonal transmission of other 4 data flows, so as to support transmission of totally 8 MU data flows.

Table 3 exemplarily shows a design of a DMRS supporting transmission of no more than 8 MU data flows, following an OCC design at the same location supporting 8 SU data flows according to an existing standard.

The OCC design may adopt a codeword design with OCCs of the length 4.

Note that in an actual application, a port number may not be limited to the ports 7, 8, 11, 13, etc.

Table 4 shows DMRS indication for no more than 8 MU data flows, accordingly.

4 bits in DCI may be used to indicate the DMRS configuration parameters according to Table 4.

OCCs work as follows. Assume that a channel on multiple Orthogonal Frequency Division Multiplexing (OFDM) symbols is invariant. A DMRS sequence may be transmitted on multiple OFDM symbols simultaneously for a diversity gain.

In a design of OCC=2 (the length of the OCCs being 2), assuming that a channel on OFDM symbols #5 and #6 remains the same, the DMRS port 7 may be transmitted in the channel on the OFDM symbols #5 and #6 using [+1 +1]. The DMRS port 8 may be transmitted in the channel on the OFDM symbols #5 and #6 using [+1 −1]. The OCCs may then be decoded as follows. The channel bearing the DMRS port 7 may be estimated as $S_7^H(y_5+y_6)/2$. The channel bearing the DMRS port 8 may be estimated as $S_8^H(y_5-y_6)/2/2$. The $S_7$ and the $S_8$ may denote signals corresponding respectively to the DMRS port 7 and the DMRS port 8. The $y_5$ and the $y_6$ may denote signals received respectively on the OFDM symbols #5 and #6. The $(\ )^H$ may denote conjugate transpose.

In a design of OCC=4 (the length of the OCCs being 4), assuming that a channel on OFDM symbols #5, #6, #12, and #13 remains the same, the DMRS port 7 may be transmitted in the channel on the OFDM symbols #5, #6, #12, and #13 using [+1 +1 +1 +1]. The DMRS port 8 may be transmitted in the channel on the OFDM symbols #5, #6, #12, and #13 using [+1 −1 +1 −1]. The DMRS port 11 may be transmitted in the channel on the OFDM symbols #5, #6, #12, and #13 using [+1 +1 −1 −1]. The DMRS port 13 may be transmitted in the channel on the OFDM symbols #5, #6, #12, and #13 using [+1 −1 −1 +1]. The OCCs may then be decoded as follows.

The channel bearing the DMRS port 7 may be estimated as $S_7^H(y_5+y_6+y_{12}+y_{13})/4$. The channel bearing the DMRS port 8 may be estimated as $S_8^H(y_5-y_6+y_{12}-y_{13})/4$. The channel bearing the DMRS port 11 may be estimated as $S_{11}^H(y_5+y_6-y_{12}-y_{13})/4$. The channel bearing the DMRS port 13 may be estimated as $S_{13}^H(y_5-y_6-y_{12}+y_{13})/4$. The $S_7$, $S_8$, $S_{11}$, and $S_{13}$ may denote signals corresponding respectively to the DMRS ports 7, 8, 11, and 13. The $y_5$, $y_6$, $y_{12}$, and $y_{13}$ may denote signals received respectively on the OFDM symbols #5, #6, #12, and #13.

For OCC=4, invariance of the channel on the OFDM symbols #5~#13 has to be assumed. However, the channel on the OFDM symbols #5~#13 may change in a mobile environment. In addition, the change in the channel may increase with increase of a mobile speed, impacting accuracy in DMRS channel estimation. While for OCC=2, invariance of the channel is assumed but on the OFDM symbols #5 and #6. As an interval thereof is small and thus the change in the channel is small, impact thereof on accuracy in DMRS channel estimation is ignorable.

Therefore, OCCs of different lengths may have to be allocated to the UE to provide better support to UE mobility.

The design of OCC=2 may be adopted for a total number of orthogonal user data flows no greater than 2 to provide better support to mobility. The design of OCC=4 may be adopted for a total number of orthogonal user data flows greater than 2 to ensure four orthogonal users, so as to avoid interference during data flow transmission.

Accordingly, according to an embodiment herein, a total number of user data flows transmitted may be no more than 8, and a number of data flows per user for MU transmission may be no more than 2. The reason is as follows. First, if the number of data flows per user for MU transmission reaches a maximum of 4, then the DMRS may take up 12 REs and 24 REs respectively for MU and SU. This turns out to be inconsistent with the conclusion of the 3GPP R8 discussion, which concludes that 4 SU data flows take up 24 REs. Secondly, there is little chance of supporting transmission of 4 SU data flows in MU-MIMO. Thirdly, MU transmission with no more than 2 data flows per user is preferred in the industry.

For one-codeword transmission, the DMRS configuration parameters allocated to the UE by the first allocating unit 101 may include at least one of: 1 layer, a port 7, a SCrambling Identity (SCID) 0, and OCC 2; or 1 layer, the port 7, an SCID 1, and OCC 2; or 1 layer, a port 8, the SCID 0, and OCC 2; or 1 layer, the port 8, the SCID 0, and OCC 2; or 1 layer, the port 7, the SCID 0, and OCC 4; or 1 layer, the port 7, the SCID 1, and OCC 4; or 1 layer, the port 8, the SCID 0, and OCC 4; or 1 layer, the port 8, the SCID 1, and OCC 4; or 1 layer, a port 11, the SCID 0, and OCC 4; or 1 layer, the port 11, the SCID 1, and OCC 4; or 1 layer, a port 13, the SCID 0, and OCC 4; or 1 layer, the port 13, the SCID 1, and OCC 4; or 2 layers, the ports 7-8, and OCC 4; or 3 layers, the ports 7-9, and OCC 4; or 4 layers, the ports 7-10, and OCC 4.

For two-codeword transmission, the DMRS configuration parameters allocated to the UE by the first allocating unit 101 may include at least one of: 2 layers, the ports 7-8, the SCID 0, and OCC 2; or 2 layers, the ports 7-8, the SCID 1, and OCC 2; or 2 layers, the ports 7-8, the SCID 0, and OCC 2; or 2 layers, the ports 7-8, the SCID 1, and OCC 4; or 2 layers, the ports 11 and 13, the SCID 0, and OCC 4; or 2 layers, the ports 11 and 13, the SCID 1, and OCC 4; or 3 layers, the ports 7-9, and OCC 4; or 4 layers, the ports 7-10, and OCC 4; or 5 layers, the ports 7-11, and OCC 4; or 6 layers, ports 7-12, and OCC 4; or 7 layers, the ports 7-13, and OCC 4; or 8 layers, ports 7-14, and OCC 4.

OCC 2 denotes the length of the OCCs of 2. OCC 4 denotes the length of the OCCs of 4. The SCID 0 denotes an SCID of 0. The SCID 1 denotes an SCID of 1.

The DMRS configuration parameters allocated to the UE may further include at least one of the number of layers, the port number, etc. The DMRS configuration parameters allocated to the UE may further include an SCID.

The BS may store the table of DMRS configuration parameters as shown in Table 5, such that the first allocating unit 101 may select, for the UE, DMRS configuration parameters corresponding to the transmitted data flow(s).

To allocate DMRS configuration parameters to the UE, the first allocating unit 101 may select, from Table 5, DMRS configuration parameters meeting a condition as needed, and include, in DCI, 4-bit indication of the value corresponding to the selected DMRS configuration parameters. For example, for three-user one-layer transmission using the 8 cases of one-layer transmission with OCC=4, the first allocating unit 101 may allocate, to each of the three users, DMRS configuration parameters that are selected from Table 5 in a descending sequential order or randomly.

The DMRS indication may indicate the information on the DMRS configuration parameters allocated to the UE. The information on the DMRS configuration parameters may include a length of OCCs.

The indicated length of OCCs may be for instructing the UE to select OCCs of the indicated length.

The DMRS indication may be of 4 bits.

The DMRS indication may be included in DCI corresponding to the UE.

The first allocating unit 101 may indicate the DMRS indication by 4 bits in the DCI corresponding to the UE.

The first allocating unit 101 and the first generating unit 102 may be implemented by at least one of a Central Processing Unit (CPU), a Micro Processing Unit (MCU), a Digital Signal Processor (DSP), a Field-Programmable Gate Array (FPGA), etc., in the BS. The first sending unit 103 may be implemented by a transmitter in the BS.

Figure 11:
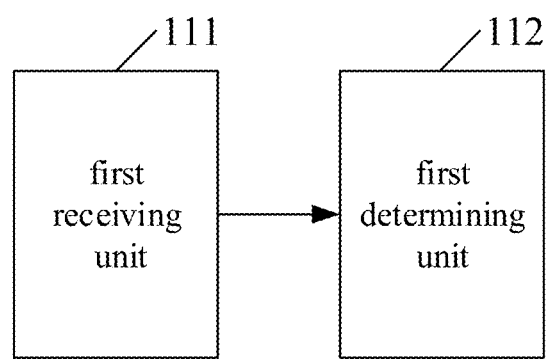
FIG. 11 is a diagram of a structure of UE according to an embodiment herein.

As shown in FIG. 11, to implement the method for indicating a DMRS described with reference to FIGS. 3-6, UE according to an embodiment herein includes a first receiving unit 111 and a first determining unit 112.

The first receiving unit 111 is arranged for receiving a De Modulation Reference Signal (DMRS) indication.

The first determining unit 112 is arranged for determining DMRS configuration parameters allocated to the UE according to the DMRS indication. The DMRS configuration parameters includes a length of Orthogonal Cover Codes (OCC).

The first receiving unit 121 may be arranged for receiving DCI. The DCI may include 4 bits indicating the DMRS indication.

The first determining unit 122 may be arranged for determining the DMRS configuration parameters allocated to the UE according to 4-bit DMRS indication in the DCI.

The DMRS configuration parameters may include a length of OCCs.

The determined length of OCCs may be 2 or 4.

The UE may also store a table of DMRS configuration parameters as shown in Table 5, so as to determine the DMRS configuration parameters allocated to the UE by searching the table for an indication of DMRS configuration parameters corresponding to the 4 bits.

When determining the DMRS configuration parameters, the first determining unit 112 may be arranged for determining the OCCs allocated to the UE according to the determined length of the OCCs and a port corresponding to the determined length of the OCCs.

The port may be determined by determining a port number.

The UE may store a table of OCCs of different lengths corresponding to different port numbers. The first determining unit 112 may determine the length of the OCCs according to the indication of DMRS configuration parameters shown in Table 5. The first determining unit 112 may determine the OCCs allocated to the UE according to the determined length of the OCCs, a port corresponding to the determined length of the OCCs, and the table of OCCs. The first determining unit 112 may select a table of OCCs of the determined length. The UE may then determine, in the selected table of OCCs and according to the determined port, the OCCs allocated to the UE.

The first receiving unit 111 may be implemented by a receiver in the UE. The first determining unit 112 may be implemented by at least one of a CPU, an MCU, a DSP, an FPGA, etc., in the UE.

Figure 12:
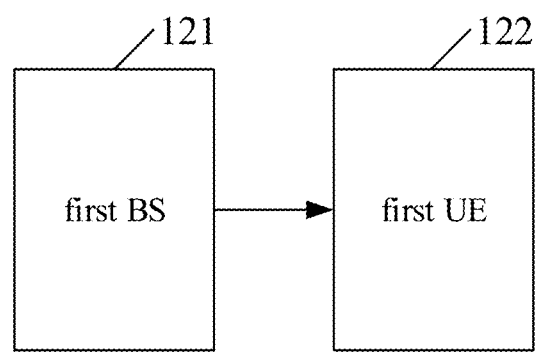
FIG. 12 is a diagram of a structure of a system for indicating a DMRS according to an embodiment herein.

As shown in FIG. 12, to implement the method for indicating a DMRS described with reference to FIGS. 3-6, a system for indicating a DMRS according to an embodiment herein includes a first BS 121 and first UE 122.

The first BS 121 is arranged for: allocating a designated DMRS port, a number of layers, and a length of Orthogonal Cover Codes (OCC) to the first UE according to a table of DMRS configuration parameters including entries indicating DMRS configuration parameters of combinations of at least two lengths of OCCs; generating a DMRS indication corresponding to information on DMRS configuration parameters allocated to the first UE; and sending the DMRS indication to the first UE.

The first UE 122 is arranged for receiving the DMRS indication sent by the first BS 121, and determining the DMRS configuration parameters allocated to the first UE according to the DMRS indication. The DMRS configuration parameters include the length of the OCCs.

Note that detailed functions of the BS 121 and the first UE 122 have been elaborated, and will not be repeated here.

With the BS, UE, and system for indicating a DMRS according to an embodiment herein, the first BS 121 allocates a designated DMRS port, a number of layers, and a length of OCCs to the first UE according to a table of DMRS configuration parameters. The table of DMRS configuration parameters includes entries indicating DMRS configuration parameters of combinations of at least two lengths of OCCs. The first BS generates a DMRS indication corresponding to information on DMRS configuration parameters allocated to the first UE. The first BS sends the DMRS indication to the first UE. The first UE 122 receives the DMRS indication, and determines the DMRS configuration parameters allocated to the first UE according to the DMRS indication. Therefore, DMRS indication in 3D MIMO is implemented. OCCs of different lengths are used for different data flow transmissions, providing better support to UE mobility, thereby ensuring system performance.

Figure 13:
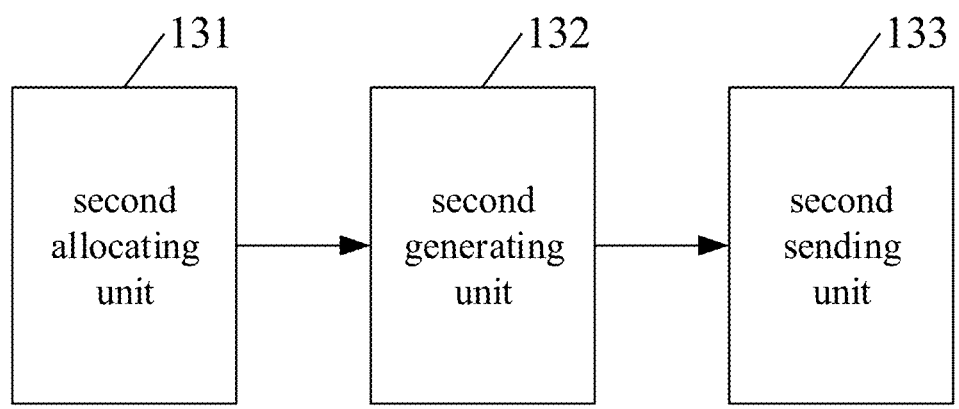
FIG. 13 is a diagram of a structure of a BS according to an embodiment herein.

As shown in FIG. 13, to implement the method for indicating a DMRS described with reference to FIGS. 7-9, a BS according to an embodiment herein applies where a total number of user data flows transmitted is no more than 8, a number of data flows per user for MU transmission is no more than 2, and a number of data flows for SU transmission is no more than 4. The BS includes a second allocating unit 131, a second generating unit 132, and a second sending unit 133.

The second allocating unit 131 is arranged for allocating DMRS configuration parameters to UE.

The second generating unit 132 is arranged for generating a DMRS indication of 3 bits corresponding to the DMRS configuration parameters allocated to the UE.

The DMRS indication indicates information on the DMRS configuration parameters allocated to the UE.

The second sending unit 133 is arranged for sending the DMRS indication to the UE.

OCC of a length 4 may be used.

The DMRS indication may be included in DCI.

The second sending unit 133 may be arranged for sending the DCI to the UE.

DMRS indication as shown in Table 4 may be indicated using 4 bits in DCI. This increases DCI overhead as it costs one more bit compared to an existing solution where 3 bits are used to indicate information on DMRS configuration parameters allocated to UE. As DCI is transmitted in a downlink sub-frame, DCI shall be designed to consume a minimal overhead. According to an embodiment herein, information on DMRS configuration parameters allocated to UE may also be indicated using 3 bits, as elaborated below.

For retransmission at a TB transmitting a two-layer data flow in transmitting 3 or 4 SU data flows using two codewords, the BS may further include a third allocating unit arranged for enabling, in DCI, 2 TBs.

The second generating unit 132 may be arranged for: indicating the information on the DMRS configuration parameters allocated to the UE using specific 3 bits in the DCI. The specific 3 bits may indicate the information on the DMRS configuration parameters allocated to the UE for retransmission using one codeword at the TB transmitting the two-layer data flow.

Data flow retransmission is so implemented for the reason(s) as follows.

Regarding indication of DMRS configuration parameters as shown in Table 4, for transmission of one data flow per user in MU-MIMO, 8 cases of one codeword may be used for DMRS indication to 8 users, as shown in Table 6.

The nature of so called retransmission may be explained first.

Fresh (first-time) transmission of more than one data flow may always be implemented using two codewords. To transmit 2N data flows, each codeword may correspond to TBs of N data flows. To transmit 2N+1 data flows, a first codeword may correspond to TBs of N data flows, and a second codeword may correspond to TBs of N+1 data flows.

Meanwhile, transmission of more than one data flow using one codeword may occur only at retransmission. Retransmission may always be implemented by a single TB, corresponds to one codeword. One codeword may be understood as one TB.

In addition, two codewords may be used for transmitting 3 fresh data flows. The two codewords may be mapped into 1 data flow and 2 data flows, respectively. If the TB transmitting the 2 data flows has not be received correctly, retransmission may be done but for the corresponding codeword. This is when 2 data flows are transmitted using one codeword.

Secondly, for retransmission of multiple SU data flows, given a relatively low probability of transmitting 5-8 SU data flows, DMRS indication for transmitting 5-8 SU data flows in the table of DMRS configuration parameters may be ignored. Namely, the number of SU data flows transmitted may be defined to be no greater than 4, thereby forming a table of DMRS configuration parameters as shown in Table 7 to indicate DMRS configuration parameters allocated to UE using 3 bits.

Accordingly, for one-codeword transmission, the DMRS configuration parameters allocated to the UE by the second allocating unit 131 may include at least one of: 1 layer, a port 7, an SCID 0; or 1 layer, the port 7, an SCID 1; or 1 layer, a port 8, the SCID 0; or 1 layer, the port 8, the SCID 1; or 1 layer, a port 11, the SCID 0; or 1 layer, the port 11, the SCID 1; or 1 layer, a port 13, the SCID 0; or 1 layer, the port 13, the SCID 1.

For two-codeword transmission, the DMRS configuration parameters allocated to the UE by the second allocating unit 131 may include at least one of: 2 layers, the ports 7-8, the SCID 0; or 2 layers, the ports 7-8, the SCID 1; or 2 layers, the ports 11 and 13, the SCID 0; or 2 layers, the ports 11 and 13, the SCID 1; or 3 layers, the ports 7-9; or 4 layers, the ports 7-10.

For retransmitted data flows, the DMRS configuration parameters allocated to the UE by the second allocating unit 131 may include at least one of: 2 layers, the ports 7-8, a codeword 0; or 2 layers, the ports 7-8, a codeword 1.

The SCID 0 may denote an SCID of 0. The SCID 1 may denote an SCID of 1.

The second allocating unit 131 may be arranged for allocating a designated DMRS port and a number of layers to the UE according to a table of DMRS configuration parameters.

The second allocating unit 131 may be arranged for: while allocating the designated DMRS port and the number of layers to the UE according to the table of DMRS configuration parameters, allocating a designated SCID to the UE according to the table of DMRS configuration parameters.

The table of DMRS configuration parameters may include eight entries indicating DMRS configuration parameters for one-codeword one-layer transmission and entries indicating DMRS configuration parameters for two-codeword transmission.

The entries indicating DMRS configuration parameters for two-codeword transmission may include four entries indicating DMRS configuration parameters for two-layer transmission, two entries indicating DMRS configuration parameters for SU three-layer to four-layer transmission, two entries indicating DMRS configuration parameters for two-layer data flow retransmission using one codeword, etc.

The BS may store the table of DMRS configuration parameters as shown in Table 7, such that the second allocating unit 131 may select, for the UE, DMRS configuration parameters corresponding to the transmitted data flow(s).

To select DMRS configuration parameters for the UE, the second allocating unit 131 may select, from Table 7, DMRS configuration parameters meeting a condition as needed, and include, in DCI, 3-bit indication of the value corresponding to the selected DMRS configuration parameters. For example, for three-user one-layer transmission using the 8 cases of one-layer transmission, the second allocating unit 131 may allocate, to each of the three users, DMRS configuration parameters that are selected from Table 7 in a descending sequential order or randomly.

The second allocating unit 131, the second generating unit 132, and the third allocating unit may be implemented by at least one of a CPU, an MCU, a DSP, an FPGA, etc., in the BS. The second sending unit 133 may be implemented by a transmitter in the BS.

Figure 14:
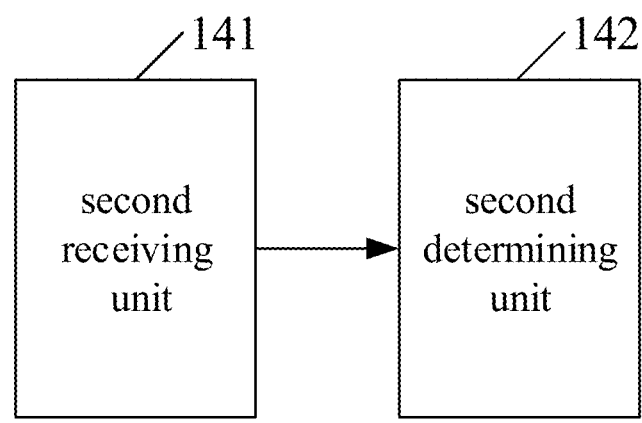
FIG. 14 is a diagram of a structure of UE according to an embodiment herein.

As shown in FIG. 14, to implement the method for indicating a DMRS described with reference to FIGS. 7-9, UE according to an embodiment herein applies where a total number of user data flows transmitted is no more than 8, a number of data flows per user for MU transmission is no more than 2, and a number of data flows for SU transmission is no more than 4. The UE includes a second receiving unit 141 and a second determining unit 142.

The second receiving unit 141 is arranged for receiving a DMRS.

The second determining unit 142 is arranged for determining DMRS configuration parameters allocated to the UE according to the DMRS indication.

The DMRS indication may be included in DCI.

The second receiving unit 142 may be arranged for receiving the DCI.

The UE may further include a third determining unit arranged for: reading TB information in the DCI; determining that 2 TBs are enabled; in response to determining that 3-bit information indicating the DMRS configuration parameters allocated to the UE in the DCI is specific 3-bit information, determining that a transmitted data flow is a two-layer data flow retransmitted using one codeword.

The UE may also store a table of DMRS configuration parameters as shown in Table 7. The third determining unit may read the TB information in received DCI. If the TB information indicates that both TBs are enabled, indications of DMRS configuration parameters corresponding to two codewords in Table 7 should be searched for a corresponding value. When the specific 3 bits in the DCI for indicating the DMRS configuration parameters allocated to the UE give 6, the third determining unit may determine that it's retransmission of two flows using the codeword 0. When the specific 3 bits in the DCI for indicating the DMRS configuration parameters allocated to the UE give 7, the UE may determine that it's retransmission of two flows using the codeword 1.

Orthogonal DMRS ports may be provided using OCCs of the length 4 for data flow transmission. When determining the DMRS configuration parameters, the second determining unit 142 may be further arranged for determining OCCs allocated to the UE using a determined port.

The port may be determined by determining a port number.

The UE may store a table of OCCs of the length 4 corresponding to different port numbers. The second determining unit 142 may determine a port number according to the table of DMRS configuration parameters shown in Table 7, and then determining OCCs allocated to the UE according to the determined port number and the table of OCCs.

The second receiving unit 141 may be implemented by a receiver in the UE. The second determining unit 142 and the third determining unit may be implemented by at least one of a CPU, an MCU, a DSP, an FPGA, etc., in the UE.

Figure 15:
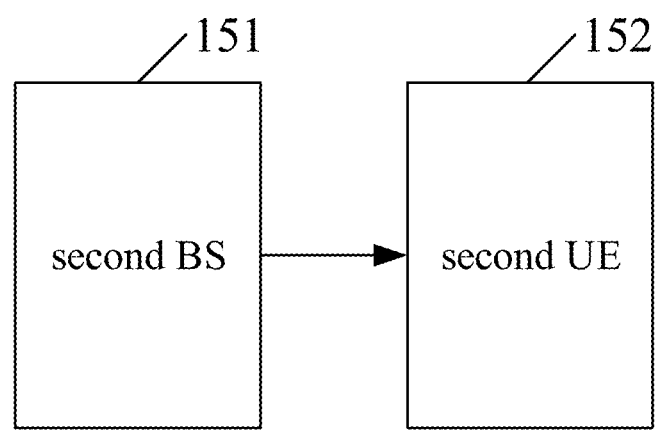
FIG. 15 is a diagram of a structure of a system for indicating a DMRS according to an embodiment herein.

As shown in FIG. 15, to implement the method for indicating a DMRS described with reference to FIGS. 7-9, a system for indicating a DMRS according to an embodiment herein applies where a total number of user data flows transmitted is no more than 8, a number of data flows per user for MU transmission is no more than 2, and a number of data flows for SU transmission is no more than 4. The system includes a second BS 151 and second UE 152.

The second BS 151 is arranged for: allocating DMRS configuration parameters to the second UE; generating a DMRS indication of 3 bits corresponding to the DMRS configuration parameters allocated to the second UE; and sending the DMRS indication to the second UE.

The second UE 152 is arranged for receiving the DMRS indication, and determining the DMRS configuration parameters allocated to the second UE according to the DMRS indication.

Note that detailed functions of the second BS 151 and the second UE 152 have been elaborated, and will not be repeated here.

With the BS, UE, and system for indicating a DMRS according to an embodiment herein, when a total number of user data flows transmitted is no more than 8, a number of data flows per user for MU transmission is no more than 2, and a number of data flows for SU transmission is no more than 4, a BS allocates DMRS configuration parameters to UE. The BS generates a DMRS indication of 3 bits corresponding to the DMRS configuration parameters allocated to the UE. The BS sends the DMRS indication to the UE. The UE receives the DMRS indication. The UE determines the DMRS configuration parameters allocated to the UE according to the DMRS indication. Therefore, DMRS indication in 3D MIMO is implemented. In addition, DMRS configuration parameters are indicated using but 3 bits in DCI, increasing no DCI overhead compared to existing 2D MIMO, reducing DCI overhead by 1 bit compared to a conventional 4-bit DCI overhead in 3D MIMO.

Those skilled in the art will know that an embodiment herein may provide a method, system, or computer program product. Therefore, an embodiment herein may take on a form of hardware, software, or a combination thereof. In addition, an embodiment herein may take on a form of a computer program product implemented on one or more computer available storage media (including but not limited to, magnetic disk memory, optic memory, and the like) containing computer available program codes.

The disclosure is illustrated with reference to flowcharts and/or block diagrams of the method, device (system) and computer-program product according to embodiments described herein. Note that each flow in the flowcharts and/or each block in the block diagrams as well as combination of flows in the flowcharts and/or blocks in the block diagrams may be implemented by instructions of a computer program. Such instructions may be offered in a processor of a general-purpose computer, a dedicated computer, an embedded processor or other programmable data processing devices to generate a machine, such that a device with a function designated in one or more flows of the flowcharts and/or one or more blocks in the block diagrams is produced by instructions executed by a processor of a computer or other programmable data processing devices.

These computer-program instructions may also be stored in a non-transitory computer-readable memory capable of guiding a computer or another programmable data processing device to work in a given way, such that the instructions stored in the computer-readable memory generate a manufactured good including an instruction device for implementing a function designated in one or more flows of the flowcharts and/or one or more blocks in the block diagrams.

These computer-program instructions may also be loaded in a computer or other programmable data processing devices, which thus executes a series of operations thereon to generate computer-implemented processing, such that the instructions executed on the computer or other programmable data processing devices provide the steps for implementing the function designated in one or more flows of the flowcharts or one or more blocks in the block diagrams.

What described are merely embodiments herein, and are not intended to limit the scope of the disclosure.

The invention claimed is:

1. A method for indicating a De Modulation Reference Signal (DMRS), applying to a Base Station (BS), the method comprising:
    allocating a designated DMRS port, a number of layers, and a length of Orthogonal Cover Codes (OCC) according to a table of DMRS configuration parameters, wherein the table of DMRS configuration parameters comprises entries indicating DMRS configuration parameters of combinations of at least two lengths of OCCs; and
    sending a DMRS indication generated corresponding to information on DMRS configuration parameters allocated,
    wherein the table of DMRS configuration parameters comprises entries indicating DMRS configuration parameters for one-codeword transmission and entries indicating DMRS configuration parameters for two-codeword transmission,
    wherein the entries indicating DMRS configuration parameters for one-codeword transmission comprise four entries indicating DMRS configuration parameters for one-layer transmission with a length of the OCCs of 2, eight entries indicating DMRS configuration parameters for one-layer transmission with a length of the OCCs of 4, three entries indicating DMRS configuration parameters for two-layer to four-layer retransmission with the length of the OCCs of 4, and a reserved entry,
    wherein the entries indicating DMRS configuration parameters for two-codeword transmission comprise two entries indicating DMRS configuration parameters for two-layer transmission with the length of the OCCs of 2, four entries indicating DMRS configuration parameters for two-layer transmission with the length of the OCCs of 4, six entries indicating DMRS configuration parameters for Single-User (SU) three-layer to eight-layer transmission with the length of the OCCs of 4, and a reserved entry.

2. The method according to claim 1, wherein the at least two lengths of OCCs are 2 and 4, respectively.

3. The method according to claim 2, wherein the DMRS indication is contained in Downlink Control Information (DCI),
    wherein the DCI is sent.

4. The method according to claim 2,
    wherein the length of the OCCs is allocated according to a total number of orthogonal user data flows,
    wherein the DMRS configuration parameters are allocated according to allocated OCCs of the allocated length and the table of DMRS configuration parameters.

5. The method according to claim 4, wherein the length of the OCCs is allocated according to the total number of orthogonal user data flows by:
    allocating a length of the allocated OCCs of 2 for a total number of orthogonal user data flows no greater than 2, or
    allocating a length of the allocated OCCs of 4 for a total number of orthogonal user data flows greater than 2.

6. The method according to claim 2,
    wherein a total number of user data flows transmitted is no more than 8,
    wherein a number of data flows per user for Multi-User (MU) transmission is no more than 2.

7. The method according to claim 1, wherein the DMRS indication is of 4 bits.

8. The method according to claim 7,
    wherein the length of the OCCs is allocated according to a total number of orthogonal user data flows,
    wherein the DMRS configuration parameters are allocated according to allocated OCCs of the allocated length and the table of DMRS configuration parameters.

9. The method according to claim 8, wherein the length of the OCCs is allocated according to the total number of orthogonal user data flows by:
    allocating a length of the allocated OCCs of 2 for a total number of orthogonal user data flows no greater than 2, or
    allocating a length of the allocated OCCs of 4 for a total number of orthogonal user data flows greater than 2.

10. The method according to claim 7,
    wherein a total number of user data flows transmitted is no more than 8,
    wherein a number of data flows per user for Multi-User (MU) transmission is no more than 2.

11. The method according to claim 1, further comprising:
when allocating the designated DMRS port, the number of layers, and the length of the OCCs,
   allocating a designated SCrambling Identity (SCID) according to the table of DMRS configuration parameters.

12. The method according to claim 11,
wherein the length of the OCCs is allocated according to a total number of orthogonal user data flows,
wherein the DMRS configuration parameters are allocated according to allocated OCCs of the allocated length and the table of DMRS configuration parameters.

13. The method according to claim 12, wherein the length of the OCCs is allocated according to the total number of orthogonal user data flows by:
   allocating a length of the allocated OCCs of 2 for a total number of orthogonal user data flows no greater than 2, or
   allocating a length of the allocated OCCs of 4 for a total number of orthogonal user data flows greater than 2.

14. The method according to claim 11,
wherein a total number of user data flows transmitted is no more than 8,
wherein a number of data flows per user for Multi-User (MU) transmission is no more than 2.

15. The method according to claim 1,
wherein the length of the OCCs is allocated according to a total number of orthogonal user data flows,
wherein the DMRS configuration parameters are allocated according to allocated OCCs of the allocated length and the table of DMRS configuration parameters.

16. The method according to claim 15, wherein the length of the OCCs is allocated according to the total number of orthogonal user data flows by:
   allocating a length of the allocated OCCs of 2 for a total number of orthogonal user data flows no greater than 2, or
   allocating a length of the allocated OCCs of 4 for a total number of orthogonal user data flows greater than 2.

17. The method according to claim 1,
wherein a total number of user data flows transmitted is no more than 8,
wherein a number of data flows per user for Multi-User (MU) transmission is no more than 2.

18. The method according to claim 1,
wherein for one-codeword transmission, the DMRS configuration parameters allocated are: 1 layer, a port 7, a SCrambling Identity (SCID) 0, and OCC 2; or 1 layer, the port 7, an SCID 1, and OCC 2; or 1 layer, a port 8, the SCID 0, and OCC 2; or 1 layer, the port 8, the SCID 0, and OCC 2; or 1 layer, the port 7, the SCID 0, and OCC 4; or 1 layer, the port 7, the SCID 1, and OCC 4; or 1 layer, the port 8, the SCID 0, and OCC 4; or 1 layer, the port 8, the SCID 1, and OCC 4; or 1 layer, a port 11, the SCID 0, and OCC 4; or 1 layer, the port 11, the SCID 1, and OCC 4; or 1 layer, a port 13, the SCID 0, and OCC 4; or 1 layer, the port 13, the SCID 1, and OCC 4; or 2 layers, the ports 7-8, and OCC 4; or 3 layers, the ports 7-9, and OCC 4; or 4 layers, the ports 7-10, and OCC 4, or
wherein for two-codeword transmission, the DMRS configuration parameters allocated are: 2 layers, the ports 7-8, the SCID 0, and OCC 2; or 2 layers, the ports 7-8, the SCID 1, and OCC 2; or 2 layers, the ports 7-8, the SCID 0, and OCC 4; or 2 layers, the ports 7-8, the SCID 1, and OCC 4; or 2 layers, the ports 11 and 13, the SCID 0, and OCC 4; or 2 layers, the ports 11 and 13, the SCID 1, and OCC 4; or 3 layers, the ports 7-9, and OCC 4; or 4 layers, the ports 7-10, and OCC 4; or 5 layers, the ports 7-11, and OCC 4; or 6 layers, ports 7-12, and OCC 4; or 7 layers, the ports 7-13, and OCC 4; or 8 layers, ports 7-14, and OCC 4,
wherein OCC 2 denotes the length of the OCCs of 2, OCC 4 denotes the length of the OCCs of 4, the SCID 0 denotes an SCID of 0, and the SCID 1 denotes an SCID of 1.

19. A method for indicating a De Modulation Reference Signal (DMRS), applying to User Equipment (UE), the method comprising:
   receiving a DMRS indication; and
   determining DMRS configuration parameters allocated according to the DMRS indication, the DMRS configuration parameters comprising a length of Orthogonal Cover Codes (OCC),
   wherein the DMRS indication is generated corresponding to information on the DMRS configuration parameters allocated,
   wherein a designated DMRS port, a number of layers, and the length of OCC are allocated according to a table of DMRS configuration parameters, wherein the table of DMRS configuration parameters comprises entries indicating DMRS configuration parameters of combinations of at least two lengths of OCCs,
   wherein the table of DMRS configuration parameters comprises entries indicating DMRS configuration parameters for one-codeword transmission and entries indicating DMRS configuration parameters for two-codeword transmission,
   wherein the entries indicating DMRS configuration parameters for one-codeword transmission comprise four entries indicating DMRS configuration parameters for one-layer transmission with a length of the OCCs of 2, eight entries indicating DMRS configuration parameters for one-layer transmission with a length of the OCCs of 4, three entries indicating DMRS configuration parameters for two-layer to four-layer retransmission with the length of the OCCs of 4, and a reserved entry,
   wherein the entries indicating DMRS configuration parameters for two-codeword transmission comprise two entries indicating DMRS configuration parameters for two-layer transmission with the length of the OCCs of 2, four entries indicating DMRS configuration parameters for two-layer transmission with the length of the OCCs of 4, six entries indicating DMRS configuration parameters for Single-User (SU) three-layer to eight-layer transmission with the length of the OCCs of 4, and a reserved entry.

20. The method according to claim 19, wherein the DMRS indication is of 4 bits.

21. The method according to claim 20, wherein the DMRS indication is contained in Downlink Control Information (DCI),
wherein the DMRS configuration parameters allocated are determined according to the 4-bit DMRS indication in the DCI.

22. The method according to claim 21, further comprising:
   determining the OCCs allocated according to the determined length of the OCCs and a port corresponding to the determined length of the OCCs.

23. The method according to claim 20, further comprising:
determining the OCCs allocated according to the determined length of the OCCs and a port corresponding to the determined length of the OCCs.

24. The method according to claim 19, further comprising:
determining the OCCs allocated according to the determined length of the OCCs and a port corresponding to the determined length of the OCCs.

25. The method according to claim 19,
wherein for one-codeword transmission, the DMRS configuration parameters allocated are: 1 layer, a port 7, a SCrambling Identity (SCID) 0, and OCC 2; or 1 layer, the port 7, an SCID 1, and OCC 2; or 1 layer, a port 8, the SCID 0, and OCC 2; or 1 layer, the port 8, the SCID 0, and OCC 2; or 1 layer, the port 7, the SCID 0, and OCC 4; or 1 layer, the port 7, the SCID 1, and OCC 4; or 1 layer, the port 8, the SCID 0, and OCC 4; or 1 layer, the port 8, the SCID 1, and OCC 4; or 1 layer, a port 11, the SCID 0, and OCC 4; or 1 layer, the port 11, the SCID 1, and OCC 4; or 1 layer, a port 13, the SCID 0, and OCC 4; or 1 layer, the port 13, the SCID 1, and OCC 4; or 2 layers, the ports 7-8, and OCC 4; or 3 layers, the ports 7-9, and OCC 4; or 4 layers, the ports 7-10, and OCC 4, or
wherein for two-codeword transmission, the DMRS configuration parameters allocated are: 2 layers, the ports 7-8, the SCID 0, and OCC 2; or 2 layers, the ports 7-8, the SCID 1, and OCC 2; or 2 layers, the ports 7-8, the SCID 0, and OCC 4; or 2 layers, the ports 7-8, the SCID 1, and OCC 4; or 2 layers, the ports 11 and 13, the SCID 0, and OCC 4; or 2 layers, the ports 11 and 13, the SCID 1, and OCC 4; or 3 layers, the ports 7-9, and OCC 4; or 4 layers, the ports 7-10, and OCC 4; or 5 layers, the ports 7-11, and OCC 4; or 6 layers, ports 7-12, and OCC 4; or 7 layers, the ports 7-13, and OCC 4; or 8 layers, ports 7-14, and OCC 4,
wherein OCC 2 denotes the length of the OCCs of 2, OCC 4 denotes the length of the OCCs of 4, the SCID 0 denotes an SCID of 0, and the SCID 1 denotes an SCID of 1.

26. A Base Station (BS), comprising:
a processor; and
memory storing instructions executable by the processor, wherein the processor is arranged for:
allocating a designated De Modulation Reference Signal (DMRS) port, a number of layers, and a length of Orthogonal Cover Codes (OCC) according to a table of DMRS configuration parameters, wherein the table of DMRS configuration parameters comprises entries indicating DMRS configuration parameters of combinations of at least two lengths of OCCs; and
sending a DMRS indication generated corresponding to information on DMRS configuration parameters allocated,
wherein the table of DMRS configuration parameters comprises entries indicating DMRS configuration parameters for one-codeword transmission and entries indicating DMRS configuration parameters for two-codeword transmission,
wherein the entries indicating DMRS configuration parameters for one-codeword transmission comprise four entries indicating DMRS configuration parameters for one-layer transmission with a length of the OCCs of 2, eight entries indicating DMRS configuration parameters for one-layer transmission with a length of the OCCs of 4, three entries indicating DMRS configuration parameters for two-layer to four-layer retransmission with the length of the OCCs of 4, and a reserved entry,
wherein the entries indicating DMRS configuration parameters for two-codeword transmission comprise two entries indicating DMRS configuration parameters for two-layer transmission with the length of the OCCs of 2, four entries indicating DMRS configuration parameters for two-layer transmission with the length of the OCCs of 4, six entries indicating DMRS configuration parameters for Single-User (SU) three-layer to eight-layer transmission with the length of the OCCs of 4, and a reserved entry.

27. The BS according to claim 26,
wherein the length of the OCCs is allocated according to a total number of orthogonal user data flows,
wherein the DMRS configuration parameters are allocated according to allocated OCCs of the allocated length and the table of DMRS configuration parameters.

28. The BS according to claim 26,
wherein for one-codeword transmission, the DMRS configuration parameters allocated are: 1 layer, a port 7, a SCrambling Identity (SCID) 0, and OCC 2; or 1 layer, the port 7, an SCID 1, and OCC 2; or 1 layer, a port 8, the SCID 0, and OCC 2; or 1 layer, the port 8, the SCID 0, and OCC 2; or 1 layer, the port 7, the SCID 0, and OCC 4; or 1 layer, the port 7, the SCID 1, and OCC 4; or 1 layer, the port 8, the SCID 0, and OCC 4; or 1 layer, the port 8, the SCID 1, and OCC 4; or 1 layer, a port 11, the SCID 0, and OCC 4; or 1 layer, the port 11, the SCID 1, and OCC 4; or 1 layer, a port 13, the SCID 0, and OCC 4; or 1 layer, the port 13, the SCID 1, and OCC 4; or 2 layers, the ports 7-8, and OCC 4; or 3 layers, the ports 7-9, and OCC 4; or 4 layers, the ports 7-10, and OCC 4, or
wherein for two-codeword transmission, the DMRS configuration parameters allocated are: 2 layers, the ports 7-8, the SCID 0, and OCC 2; or 2 layers, the ports 7-8, the SCID 1, and OCC 2; or 2 layers, the ports 7-8, the SCID 0, and OCC 4; or 2 layers, the ports 7-8, the SCID 1, and OCC 4; or 2 layers, the ports 11 and 13, the SCID 0, and OCC 4; or 2 layers, the ports 11 and 13, the SCID 1, and OCC 4; or 3 layers, the ports 7-9, and OCC 4; or 4 layers, the ports 7-10, and OCC 4; or 5 layers, the ports 7-11, and OCC 4; or 6 layers, ports 7-12, and OCC 4; or 7 layers, the ports 7-13, and OCC 4; or 8 layers, ports 7-14, and OCC 4,
wherein OCC 2 denotes the length of the OCCs of 2, OCC 4 denotes the length of the OCCs of 4, the SCID 0 denotes an SCID of 0, and the SCID 1 denotes an SCID of 1.

29. User Equipment (UE), comprising:
a processor; and
memory storing instructions executable by the processor, wherein the processor is arranged for:
receiving a De Modulation Reference Signal (DMRS) indication; and
determining DMRS configuration parameters allocated according to the DMRS indication, the DMRS configuration parameters comprising a length of Orthogonal Cover Codes (OCC),
wherein the DMRS indication is generated corresponding to information on the DMRS configuration parameters allocated, wherein a designated DMRS port, a number of layers, and the length of OCC are allocated according to a table of DMRS configuration parameters, wherein the table of DMRS configuration parameters comprises entries indicating DMRS configuration parameters of combinations of at least two lengths of OCCs, wherein the table of DMRS configuration parameters comprises entries indicating DMRS configuration parameters for one-codeword transmission and entries indicating DMRS configuration parameters for two-codeword transmission, wherein the entries indicating DMRS configuration parameters for one-codeword transmission comprise four entries indicating DMRS configuration parameters for one-layer transmission with a length of the OCCs of 2, eight entries indicating DMRS configuration parameters for one-layer transmission with a length of the OCCs of 4, three entries indicating DMRS configuration parameters for two-layer to four-layer retransmission with the length of the OCCs of 4, and a reserved entry, wherein the entries indicating DMRS configuration parameters for two-codeword transmission comprise two entries indicating DMRS configuration parameters for two-layer transmission with the length of the OCCs of 2, four entries indicating DMRS configuration parameters for two-layer transmission with the length of the OCCs of 4, six entries indicating DMRS configuration parameters for Single-User (SU) three-layer to eight-layer transmission with the length of the OCCs of 4, and a reserved entry.

30. The UE according to claim 29, wherein the DMRS indication is contained in Downlink Control Information (DCI), wherein the DMRS configuration parameters allocated are determined according to 4-bit DMRS indication in the DCI.

* * * * *